(12) United States Patent
Ginis et al.

(10) Patent No.: US 10,904,089 B2
(45) Date of Patent: *Jan. 26, 2021

(54) METHODS SYSTEMS, AND APPARATUSES FOR IMPLEMENTING UPSTREAM POWER CONTROL FOR DSL

(71) Applicant: ASSIA SPE, LLC, Wilmington, DE (US)

(72) Inventors: Georgios Ginis, Palo Alto, CA (US); Ming-Yang Chen, Palo Alto, CA (US); Mehdi Mohseni, San Francisco, CA (US)

(73) Assignee: ASSIA SPE, LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 16/900,965

(22) Filed: Jun. 14, 2020

(65) Prior Publication Data
US 2020/0313962 A1  Oct. 1, 2020

Related U.S. Application Data

(63) Continuation of application No. 16/290,073, filed on Mar. 1, 2019, now Pat. No. 10,721,128, which is a continuation of application No. 14/786,438, filed as application No. PCT/US2013/037805 on Apr. 23, 2013, now Pat. No. 10,225,147.

(51) Int. Cl.
*H04L 12/24* (2006.01)
*H04B 3/32* (2006.01)
*H04L 12/26* (2006.01)

(52) U.S. Cl.
CPC ............ *H04L 41/083* (2013.01); *H04B 3/32* (2013.01); *H04L 41/0896* (2013.01); *H04L 43/0894* (2013.01); *Y04S 40/00* (2013.01)

(58) Field of Classification Search
CPC ....... H04L 25/14; H04L 25/4925; H04L 5/20; H04L 25/0272; H04L 25/49; H04L 41/083; H04L 41/0896; H04L 43/0894; H04Q 11/04; H04B 3/46–487; H04B 3/54; H04B 3/32
USPC .......... 375/219–228, 259–288; 379/414–417
See application file for complete search history.

(56) References Cited

U.S. PATENT DOCUMENTS

| | | | | |
|---|---|---|---|---|
| 6,636,603 B1 * | 10/2003 | Milbrandt | ............ | H04B 3/46 370/255 |
| 7,170,905 B1 * | 1/2007 | Baum | ............ | H04L 47/2408 370/401 |
| 7,593,458 B2 * | 9/2009 | Cioffi | ............ | H04B 3/32 375/222 |

(Continued)

*Primary Examiner* — James M Perez
(74) *Attorney, Agent, or Firm* — North Weber and Baugh LLP; Michael North

(57) ABSTRACT

Apparatuses, systems, and methods assign to a first group of DSL lines a first set of loop lengths and a second set of loop lengths to a second group of DSL lines. A first set of power control parameters is identified for the first group of DSL lines to enable a first upstream rate, subject to a given set of criteria for the second group of DSL lines or subject to a second set of power control parameters for the second group of DSL lines. The first and second sets of power control parameters may then be applied to their respective groups of DSL lines, e.g., to implement upstream power control.

20 Claims, 11 Drawing Sheets

(56) References Cited

U.S. PATENT DOCUMENTS

| | | | | |
|---|---|---|---|---|
| 7,809,116 | B2* | 10/2010 | Rhee | H04L 43/08 379/1.04 |
| 7,881,438 | B2* | 2/2011 | Cioffi | H04M 3/247 379/1.04 |
| 7,924,736 | B2* | 4/2011 | Cioffi | H04L 41/145 370/252 |
| 8,073,135 | B2* | 12/2011 | Rhee | H04M 11/062 379/417 |
| 8,483,309 | B2* | 7/2013 | Gernegross | H04Q 11/04 375/285 |
| 8,817,857 | B2* | 8/2014 | Singh | H04B 3/487 375/222 |
| 8,855,279 | B2* | 10/2014 | Forbes, Jr. | H04B 3/54 379/106.03 |
| 9,247,328 | B2* | 1/2016 | Schneider | H04Q 11/04 |
| 9,288,308 | B2* | 3/2016 | Cuzzola | H04L 12/2898 |
| 9,332,327 | B2* | 5/2016 | Schneider | H04Q 11/04 |
| 9,425,858 | B2* | 8/2016 | Singh | H04B 3/487 |
| 9,780,956 | B2* | 10/2017 | Kerpez | H04L 1/0002 |
| 10,051,117 | B2* | 8/2018 | Zahedi | H04L 41/0677 |
| 10,225,147 | B2* | 3/2019 | Ginis | H04B 3/32 |
| 10,263,866 | B2* | 4/2019 | Kerpez | H04L 1/24 |
| 10,284,713 | B2* | 5/2019 | Flowers | H04B 3/46 |
| 10,298,474 | B2* | 5/2019 | Joanny | H04L 43/0823 |
| 10,333,819 | B2* | 6/2019 | Chow | H04L 41/0896 |
| 10,356,151 | B2* | 7/2019 | Chung | H04M 3/304 |
| 10,374,887 | B2* | 8/2019 | Kerpez | H04L 41/04 |
| 10,375,590 | B2* | 8/2019 | Bhagavatula | H04W 24/08 |
| 10,440,591 | B2* | 10/2019 | Lee | H04W 8/245 |
| 10,454,797 | B2* | 10/2019 | Balakrishnan | H04L 41/0823 |
| 10,484,261 | B2* | 11/2019 | Yun | H04L 43/0823 |
| 10,512,000 | B2* | 12/2019 | Murugesan | H04W 72/1252 |
| 10,523,810 | B2* | 12/2019 | Mohseni | H04L 41/0677 |
| 10,530,695 | B2* | 1/2020 | Cioffi | H04L 41/0893 |
| 10,567,266 | B2* | 2/2020 | Cioffi | H04L 12/5692 |
| 10,581,683 | B2* | 3/2020 | Cioffi | H04M 11/062 |
| 10,721,128 | B2* | 7/2020 | Ginis | H04L 43/0894 |
| 2003/0086514 | A1* | 5/2003 | Ginis | H04L 27/2608 375/346 |
| 2003/0198217 | A1* | 10/2003 | Redfern | H04L 5/143 370/352 |
| 2004/0095921 | A1* | 5/2004 | Kerpez | H04M 3/304 370/351 |
| 2004/0258000 | A1* | 12/2004 | Kamali | H04M 11/062 370/252 |
| 2005/0271075 | A1* | 12/2005 | Cioffi | H04L 12/2889 370/445 |
| 2006/0098725 | A1* | 5/2006 | Rhee | H04B 3/48 375/222 |
| 2006/0274893 | A1* | 12/2006 | Cioffi | H04B 3/487 379/399.01 |
| 2006/0280237 | A1* | 12/2006 | Rhee | H04L 5/0064 375/222 |
| 2007/0036339 | A1* | 2/2007 | Cioffi | H04M 3/304 379/399.01 |
| 2007/0036340 | A1* | 2/2007 | Rhee | H04M 3/304 379/399.01 |
| 2007/0081582 | A1* | 4/2007 | Ginis | H04B 3/32 375/222 |
| 2007/0274404 | A1* | 11/2007 | Papandriopoulos | H04B 3/32 375/260 |
| 2008/0205501 | A1* | 8/2008 | Cioffi | H04M 3/2209 375/224 |
| 2008/0219290 | A1* | 9/2008 | Cioffi | H04L 5/1438 370/465 |
| 2008/0298444 | A1* | 12/2008 | Cioffi | H04M 11/062 375/222 |
| 2009/0207985 | A1* | 8/2009 | Cioffi | H04L 25/0292 379/93.01 |
| 2010/0067524 | A1* | 3/2010 | Luthra | H04L 47/70 370/389 |
| 2011/0051906 | A1* | 3/2011 | Cioffi | H04L 12/2898 379/32.04 |
| 2011/0085799 | A1* | 4/2011 | Mizutani | H04Q 11/0067 398/37 |
| 2011/0211623 | A1* | 9/2011 | Kanellakopoulos | H04M 11/062 375/222 |
| 2011/0286503 | A1* | 11/2011 | Cioffi | H04B 3/487 375/220 |
| 2012/0027060 | A1* | 2/2012 | Singh | H04B 3/487 375/222 |
| 2012/0082258 | A1* | 4/2012 | Nuzman | H04M 3/18 375/285 |
| 2012/0219123 | A1* | 8/2012 | Berg | H04B 3/487 379/27.01 |
| 2012/0250492 | A1* | 10/2012 | Schneider | H04Q 11/04 370/201 |
| 2012/0275453 | A1* | 11/2012 | Schneider | H04Q 11/04 370/386 |
| 2012/0278371 | A1* | 11/2012 | Montalvo | G06F 16/182 707/827 |
| 2012/0321052 | A1* | 12/2012 | Morrill | H04L 67/18 379/32.01 |
| 2013/0013931 | A1* | 1/2013 | O'Hare | H04L 9/085 713/189 |
| 2013/0132854 | A1* | 5/2013 | Raleigh | H04W 4/60 715/738 |
| 2013/0170628 | A1* | 7/2013 | Alloin | H04L 1/20 379/22 |
| 2013/0208579 | A1* | 8/2013 | Strobel | H04B 3/32 370/201 |
| 2014/0023127 | A1* | 1/2014 | Pereira | H04B 3/487 375/224 |
| 2014/0233710 | A1* | 8/2014 | Tu | H04B 3/487 379/32.04 |
| 2014/0369480 | A1* | 12/2014 | Cioffi | H04B 3/32 379/93.01 |
| 2015/0124859 | A1* | 5/2015 | Cuzzola | H04L 12/12 375/222 |
| 2015/0146767 | A1* | 5/2015 | Kerpez | H04B 3/487 375/227 |
| 2015/0207720 | A1* | 7/2015 | Dagum | H04L 43/0852 370/252 |
| 2015/0222326 | A1* | 8/2015 | Cioffi | H04B 3/32 370/201 |
| 2015/0230275 | A1* | 8/2015 | Kerpez | H04W 72/0406 370/329 |
| 2015/0280892 | A1* | 10/2015 | Verbin | H04L 5/14 370/294 |
| 2015/0321098 | A1* | 11/2015 | van der Laan | H04N 21/6405 463/31 |
| 2016/0006622 | A1* | 1/2016 | Bednarz | G06Q 10/0639 370/252 |
| 2016/0028434 | A1* | 1/2016 | Kerpez | H04M 11/062 379/406.02 |
| 2016/0080031 | A1* | 3/2016 | Kassel | H04B 3/238 379/406.06 |
| 2016/0087864 | A1* | 3/2016 | Kerpez | H04M 11/062 370/242 |
| 2016/0366012 | A1* | 12/2016 | Ginis | H04L 41/0896 |
| 2017/0180549 | A1* | 6/2017 | Zahedi | H04B 3/46 |
| 2019/0199583 | A1* | 6/2019 | Ginis | H04L 41/0896 |
| 2019/0363967 | A1* | 11/2019 | Yun | H04L 43/10 |
| 2020/0153692 | A1* | 5/2020 | Cioffi | H04L 41/0823 |
| 2020/0153974 | A1* | 5/2020 | Kerpez | H04B 15/005 |

\* cited by examiner

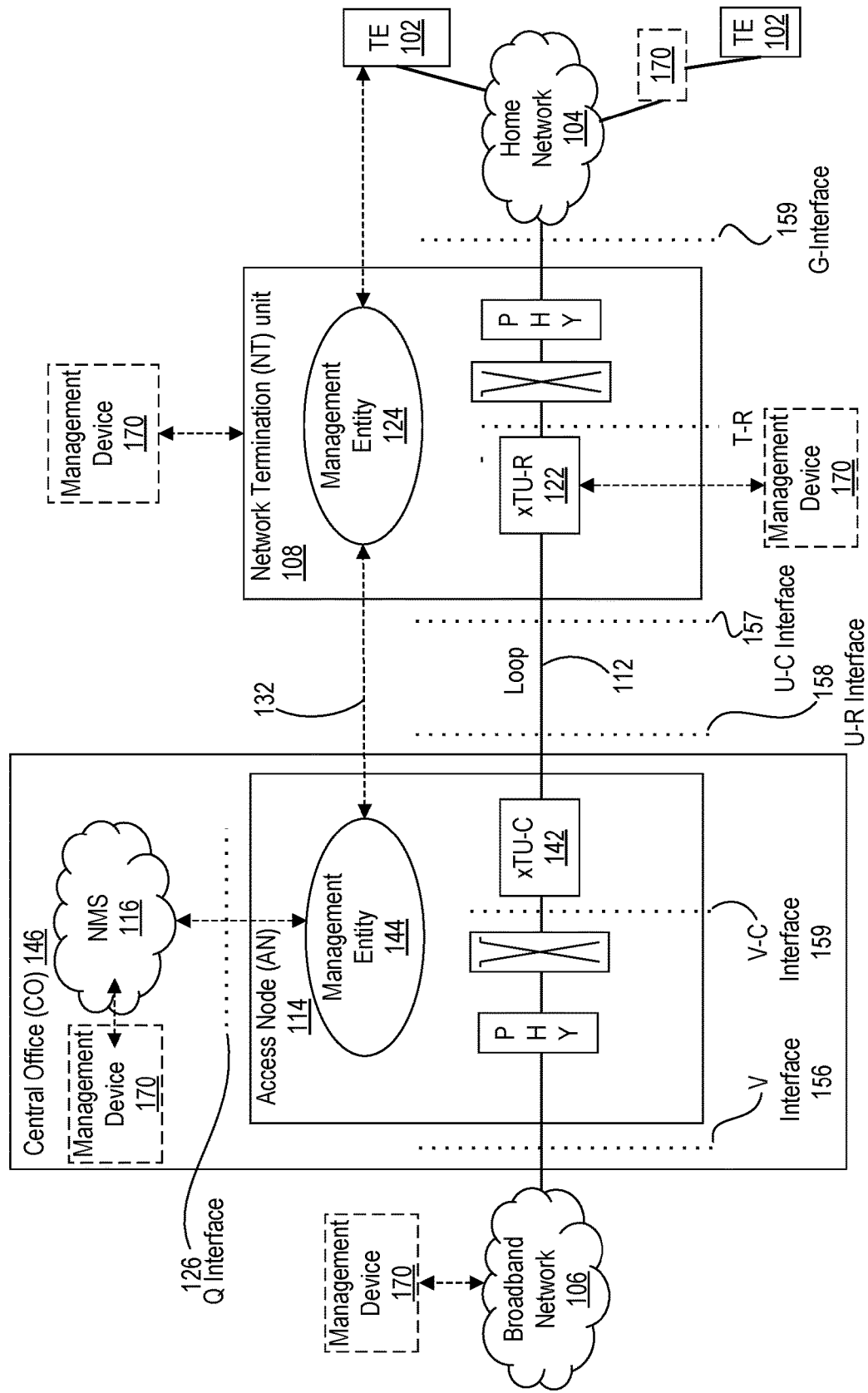

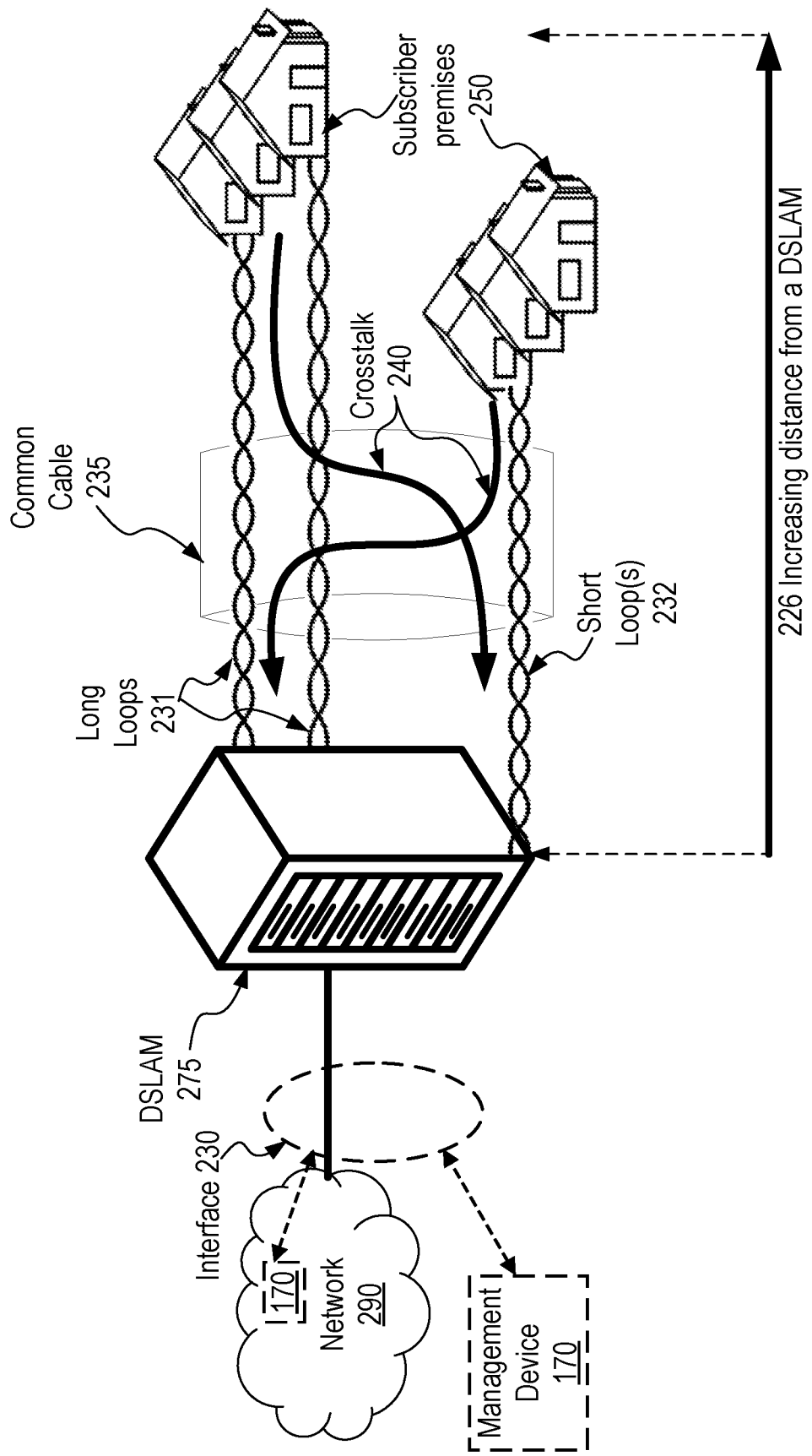

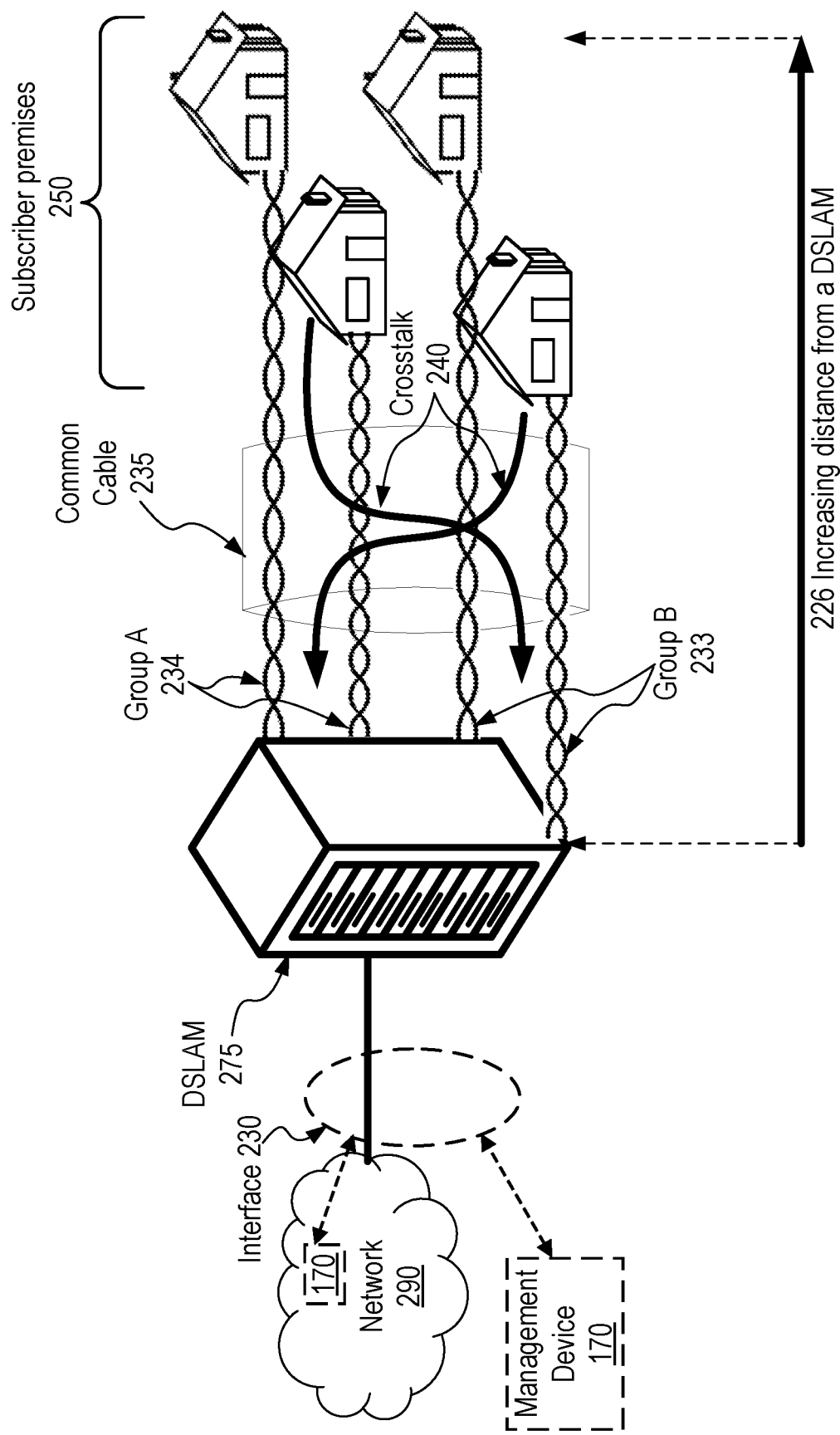

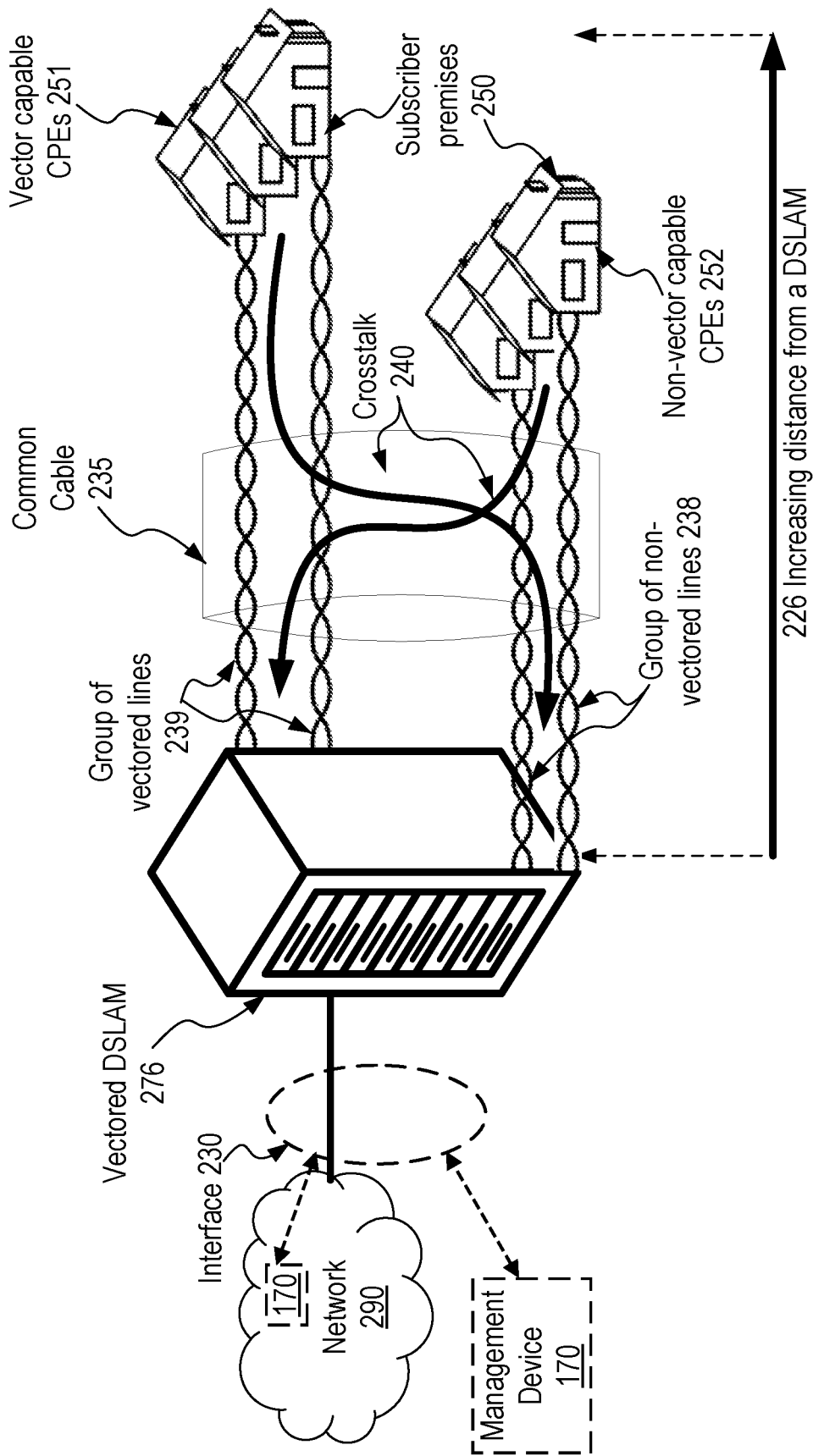

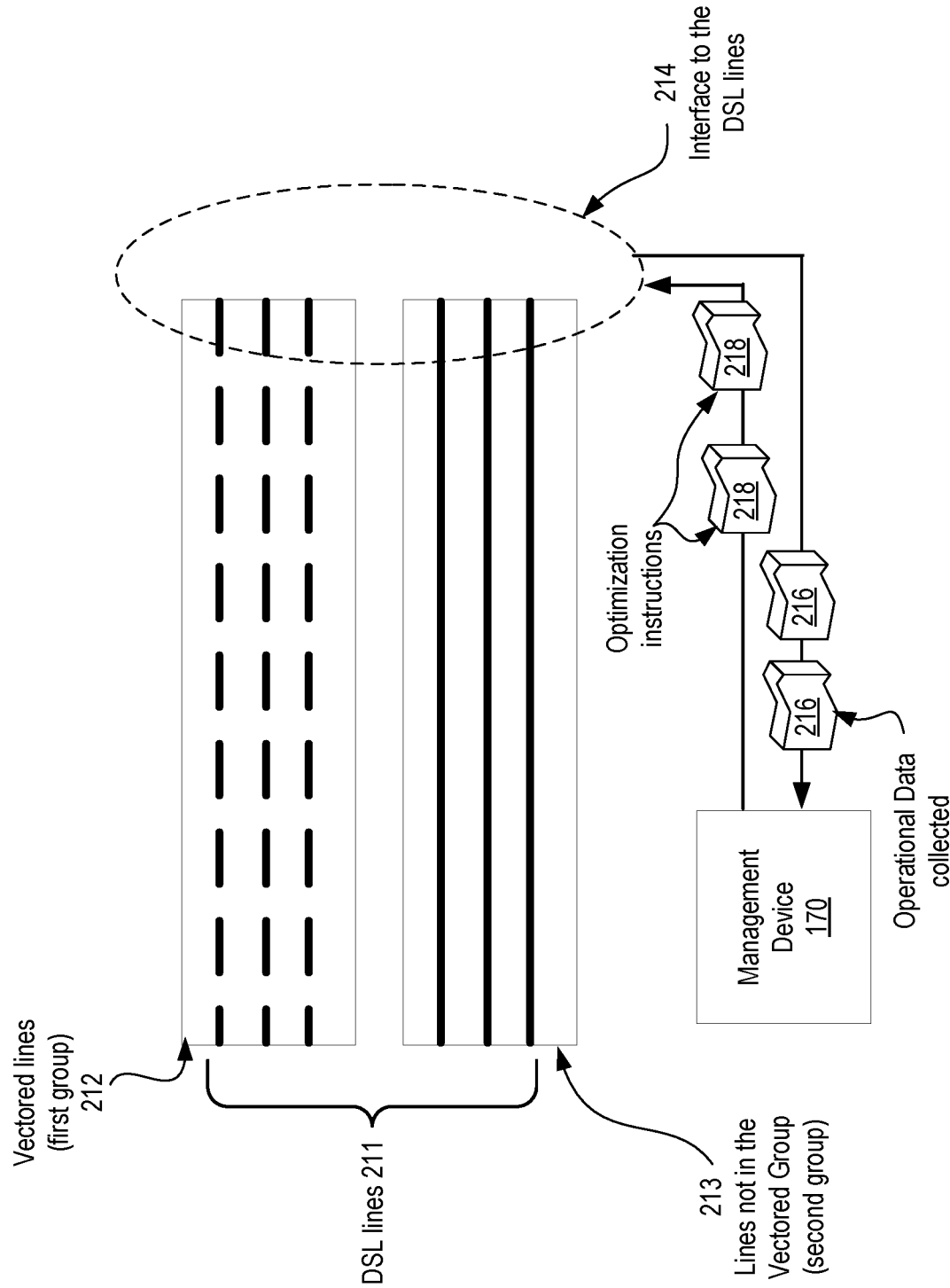

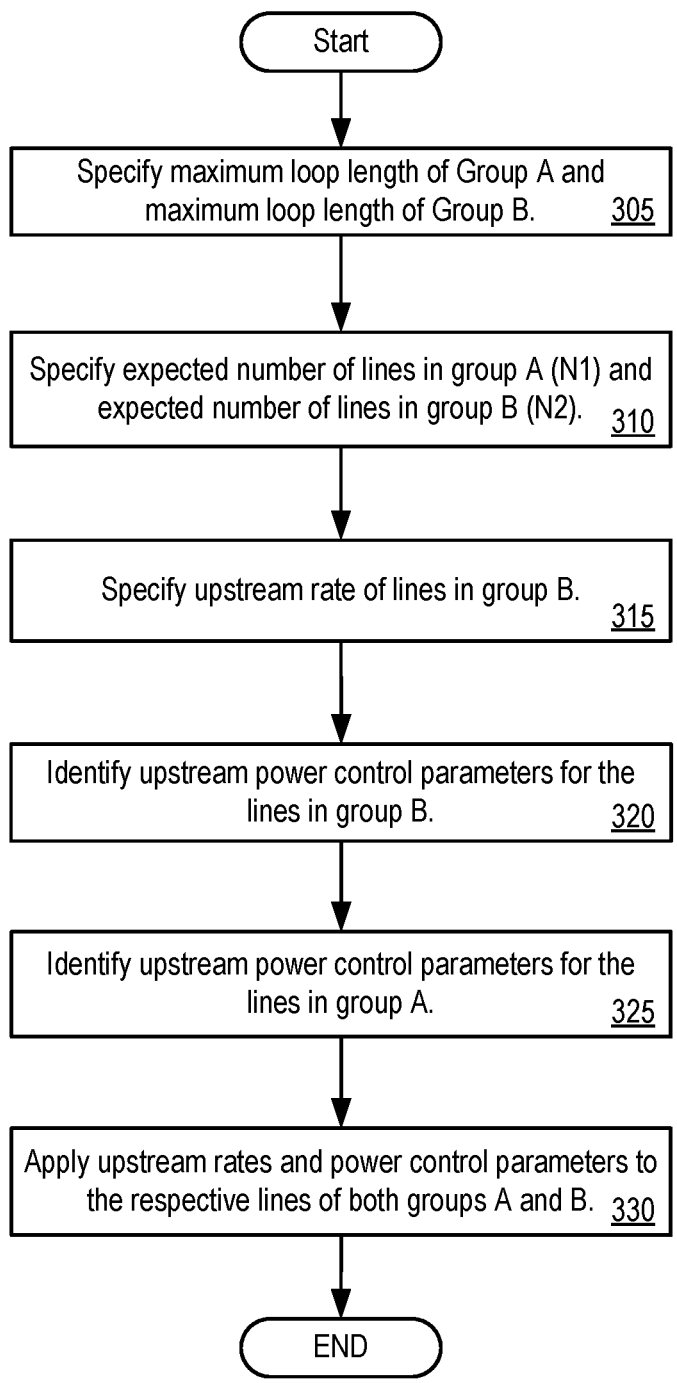

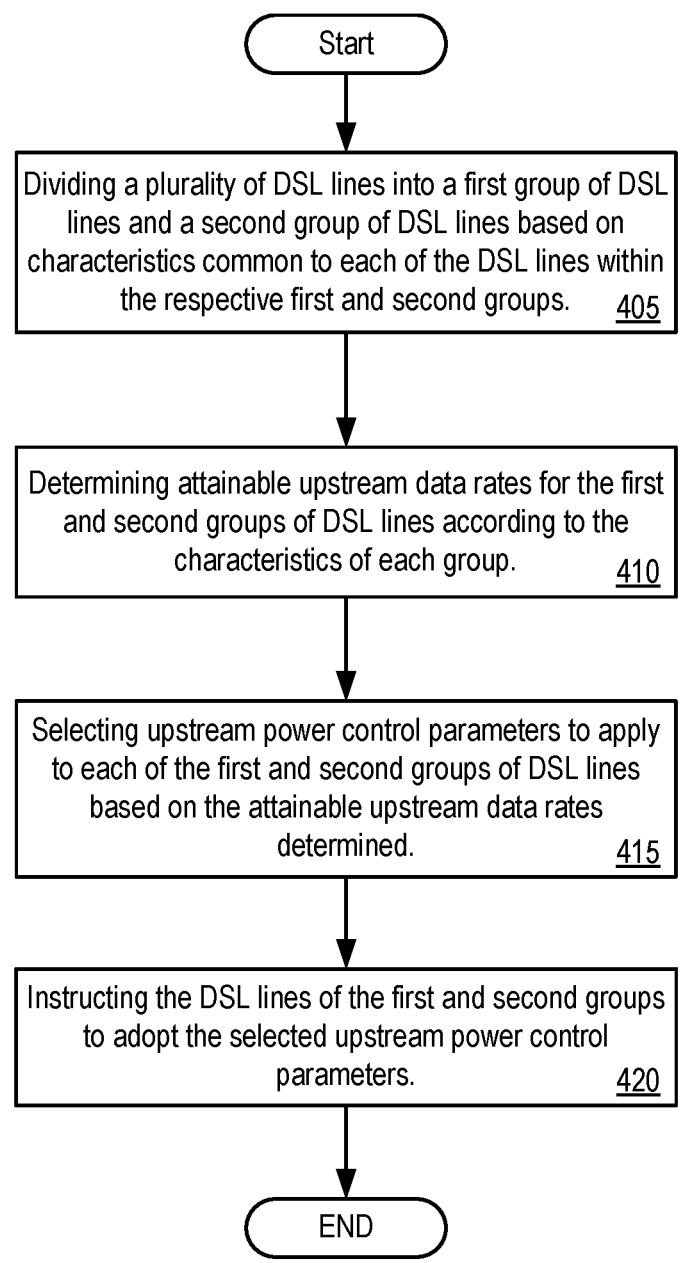

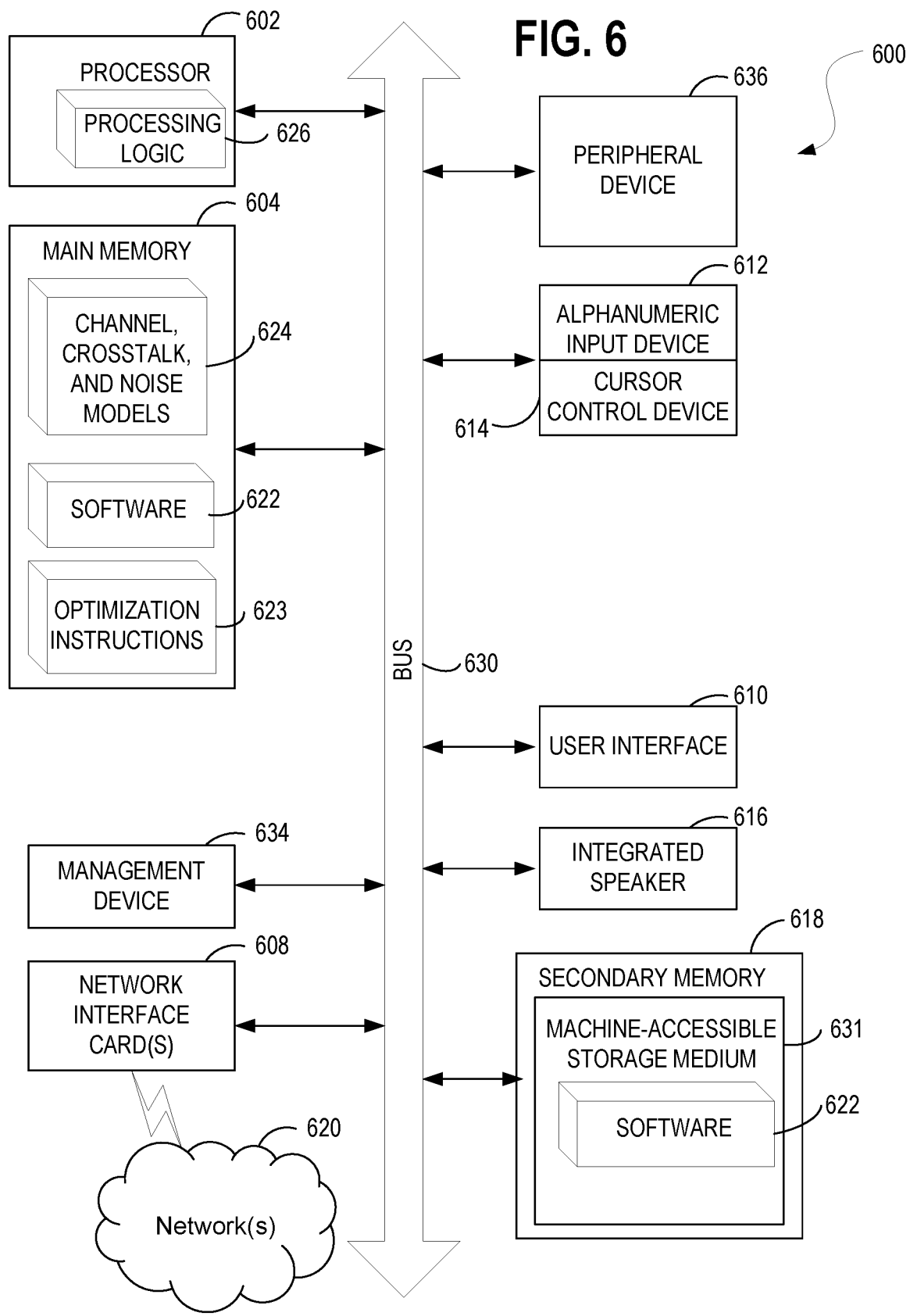

METHODS SYSTEMS, AND APPARATUSES FOR IMPLEMENTING UPSTREAM POWER CONTROL FOR DSL

CROSS-REFERENCE TO RELATED APPLICATIONS

This application is a continuation of previously filed and U.S. patent application Ser. No. 16/290,073, filed on Mar. 1, 2016, entitled "METHODS, SYSTEMS, AND APPARATUSES FOR IMPLEMENTING UPSTREAM POWER CONTROL FOR DSL," naming as inventors Georgios Ginis, Ming-Yang Chen, and Mehdi Mohseni, which is a continuation of U.S. patent application Ser. No. 14/786,438, filed on Jul. 29, 2016, now U.S. Pat. No. 10,225,147, granted on Mar. 5, 2019, entitled "METHODS, SYSTEMS, AND APPARATUSES FOR IMPLEMENTING UPSTREAM POWER CONTROL FOR DSL," naming as inventors Georgios Ginis, Ming-Yang Chen, and Mehdi Mohseni, which is the US national stage application under 35 USC § 371 of PCT Patent Application No. PCT/US13/37805, filed Apr. 23, 2013, which applications are hereby incorporated by reference in their entireties and for all purposes.

TECHNICAL FIELD

The subject matter described herein relates generally to the field of computing, and more particularly, to methods, systems, and apparatuses for implementing upstream power control for DSL.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed subject matter.

In the communications arts there is a phenomenon known as the "near-far problem" in which receivers capturing strong signals have difficulty simultaneously detecting weaker signals. In the DSL arts specifically, an upstream near-far problem may exist in which crosstalk from near-end (strong) users impacts signaling of far-end (weak) users, or in which users coupled with short loops exhibit stronger signals than users on longer more attenuated loops, and thus, the stronger signaling users significantly degrade the weaker signaling users' data rates.

DSL transmissions are negatively impacted by crosstalk and such effects are exhibited most strongly with short loops. Moreover, such crosstalk is especially problematic for transmissions in the upstream direction where DSL upstream transmissions on short loops cause very strong crosstalk to DSL upstream transmissions on longer loops, thus resulting in the well known near-far problem.

In a laboratory setting it may be feasible to architect an experiment with DSL lines or loops of approximately equal length such that across the board power control parameters would suffice. Optionally, vectoring could be applied to all of the lines so as to perfectly cancel all crosstalk. However, it is very well understood by those skilled in the relevant arts that such pristine laboratory conditions simply do not translate to the real world. Actual DSL deployments in the field commonly consist of both shorter and longer DSL loops as well as potentially non-vectored lines co-located with DSL loops of a vectored group.

Instituting what is known as a power back-off for all lines is a simple solution to reduce crosstalk but also results in lower transmission rates and is therefore impractical for many deployments. Vectoring as noted above greatly reduces crosstalk but requires new equipment to be deployed and thus may not be available or may only be available on a sub-set of co-located DSL lines, and thus does not solve the problem of crosstalk for those non-vectored lines or for vectored lines which operate near non-vectored lines.

The present state of the art may therefore benefit from methods, systems, and apparatuses for implementing upstream power control for DSL as described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 1 illustrates an exemplary architecture in which embodiments may operate;

FIG. 2A illustrates an exemplary architecture within which embodiments may operate;

FIG. 2B illustrates another exemplary architecture within which embodiments may operate;

FIG. 2D illustrates another exemplary architecture within which embodiments may operate;

FIG. 2F illustrates another exemplary architecture within which embodiments may operate;

FIGS. 3 and 4 depict flow diagrams illustrating methods for implementing and using improved upstream power control schemes for DSL communications in accordance with described embodiments;

FIG. 6 illustrates a diagrammatic representation of a machine in the exemplary form of a computer system.

DETAILED DESCRIPTION

Figure 2C:
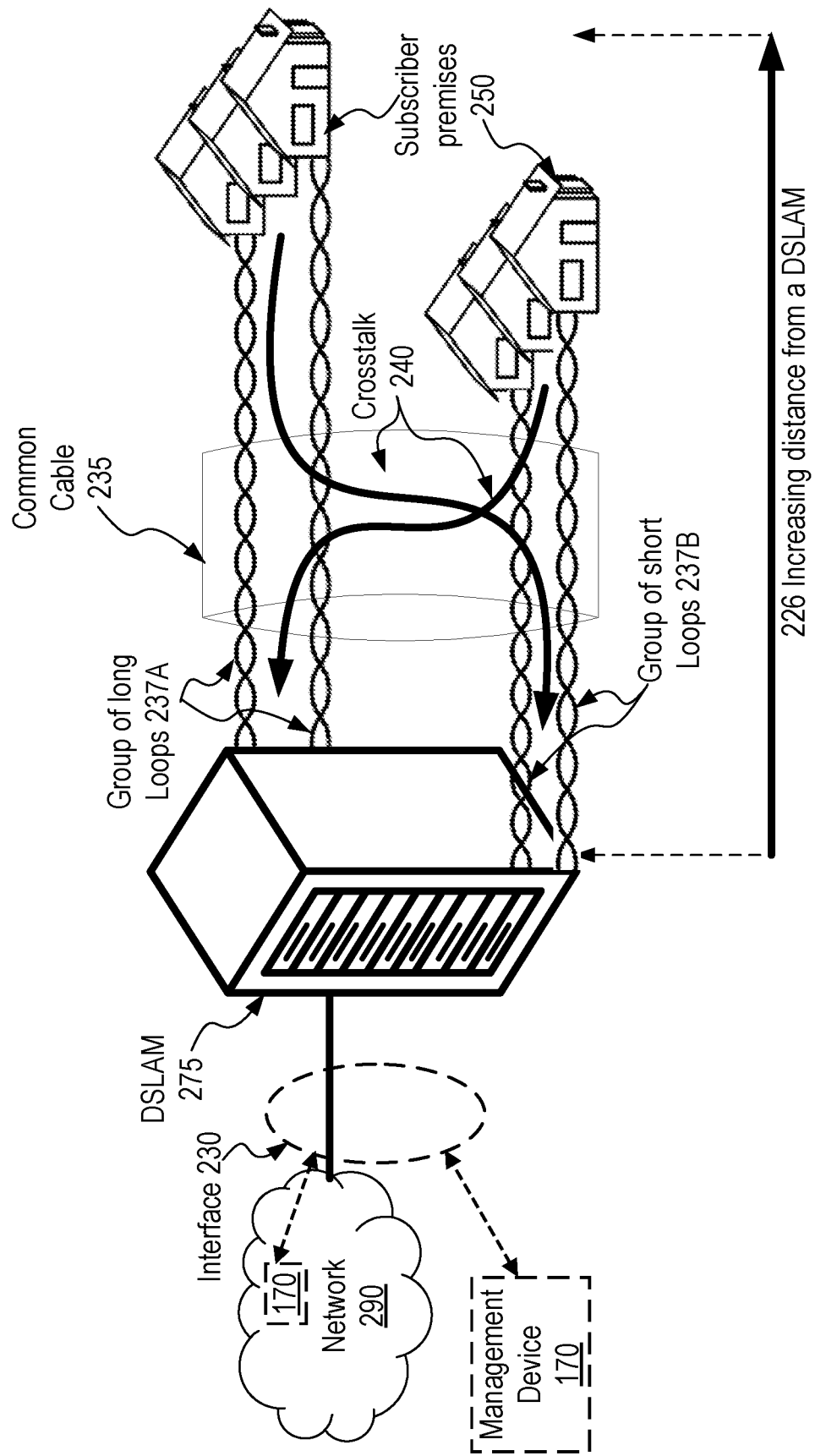
FIG. 2C illustrates another exemplary architecture within which embodiments may operate.

Described herein are apparatuses, systems and methods for implementing upstream power control for DSL communications.

In accordance with one embodiment, an exemplary system may include means for: dividing a plurality of DSL lines into a first group of DSL lines and a second group of DSL lines based on characteristics common to each of the DSL lines within the respective first and second groups; determining attainable upstream data rates for the first and second groups of DSL lines according to the characteristics of each group; selecting upstream power control parameters to apply to each of the first and second groups of DSL lines based on the attainable upstream data rates determined; and instructing the DSL lines of the first and second groups to adopt the selected upstream power control parameters.

Power control may be applied to short DSL loops or lines to prevent very low rates or non-connection events on longer loops which are negatively impacted by the near-far problem described above. In a fully vectored system crosstalk is completely canceled and there is no need for short DSL lines to back off power on behalf of the long lines because the near-far problem does not exist. However, many deployments are not fully vectored, and as such, the near-far problem remains where some but not all DSL loops are vectored or where none of the DSL loops are vectored. The near-far problem may also occur between two groups of lines belonging to different vectored groups in which lines within the respective vectored groups do not exhibit crosstalk onto one another but alien crosstalk may occur between the vectored groups, despite all lines being vectored. Other types of groupings may also benefit from techniques to enhance performance of one group over another or improve overall operation of the DSL communication system by grouping lines according to common characteristics and then determining and applying different upstream power control parameters to each of the respective groups.

Take for instance a grouping of 24 DSL lines. Half of the customers sign up for 10 Mbps service and the other half of the customers pay extra subscription fees to sign up for 20 Mbps. The lines in each of the two groups are likely to have different line lengths as customers do not select their tier of service based on how far their CPE side modem is from a DSLAM of a DSL service provider. Most customers are likely unaware that such constraints even exist. Nevertheless, a DSL service provider will benefit from the flexibility of offering customers higher subscription tiers, even at longer loop lengths from a DSLAM as the greater portion of customers that can be offered such service will presumably yield greater service revenues to the DSL service provider and greater choice, flexibility, and satisfaction for the consumers.

Given the groupings then of the higher tier subscribers and the lower tier subscribers, a maximum length may be determined for the lines of the higher subscription tier group and then through modeling or DSL estimation a management device may determine the maximum upstream data rate that can be offered to the higher tier of subscribers or a management device may alternatively or additionally determine a maximum length of DSL line capable of being serviced at the higher subscription tier based upon the requisite data rates for that tier.

Appropriate upstream power parameters are then determined for the groups such that the consumers in the higher subscription tier will achieve their promised data rates while also permitting acceptable data rates for the lower tier subscribers. Such techniques are described in further detail below including additional and alternative considerations utilized to determine the attainable data rates and necessary upstream power parameters to attain such rates.

In the following description, numerous specific details are set forth such as examples of specific systems, languages, components, etc., in order to provide a thorough understanding of the various embodiments. It will be apparent, however, to one skilled in the art that these specific details need not be employed to practice the disclosed embodiments. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software, including software instructions that perform the operations described herein via memory and one or more processors of a computing platform.

Embodiments also relate to a system or apparatus for performing the operations herein. The disclosed system or apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, flash, NAND, solid state drives (SSDs), CD-ROMs, and magnetic-optical disks, read-only memories (ROMs), random access memories (RAMs), EPROMs, EEPROMs, magnetic or optical cards, or any type of media suitable for storing non-transitory electronic instructions, each coupled to a computer system bus. In one embodiment, a non-transitory computer readable storage medium having instructions stored thereon, causes one or more processors within an apparatus to perform the methods and operations which are described herein. In another embodiment, the instructions to perform such methods and operations are stored upon a non-transitory computer readable medium for later execution.

The algorithms and displays presented herein are not inherently related to any particular computer or other apparatus nor are embodiments described with reference to any particular programming language. It will be appreciated that a variety of programming languages may be used to implement the teachings of the embodiments as described herein.

FIG. 1 illustrates an exemplary architecture 100 in which embodiments may operate. Asymmetric Digital Subscriber Line (ADSL) systems (one form of Digital Subscriber Line (DSL) systems), which may or may not include splitters, operate in compliance with the various applicable standards such as ADSL1 (G.992.1), ADSL-Lite (G.992.2), ADSL2 (G.992.3), ADSL2-Lite G.992.4, ADSL2+(G.992.5) and the G.993.x emerging Very-high-speed Digital Subscriber Line or Very high-bitrate Digital Subscriber Line (VDSL) standards, as well as the G.991.1 and G.991.2 Single-Pair High-speed Digital Subscriber Line (SHDSL) standards, all with and without bonding, and/or the G.997.1 standard (also known as G.ploam).

The G.997.1 standard specifies the physical layer management for ADSL transmission systems based on the clear, Embedded Operation Channel (EOC) defined in G.997.1 and use of indicator bits and EOC messages defined in the G.992.x, G.993.x and G.998.4 standards. Moreover, G.997.1 specifies network management elements content for configuration and performance management. In performing the disclosed functions, systems may utilize a variety of operational data (which includes performance data) that is available at an Access Node (AN).

In FIG. 1, users terminal equipment (TE) 102 (e.g., a Customer Premises Equipment (CPE) device or a remote terminal device, network node, LAN device, etc.) is coupled to a home network 104, which in turn is coupled to a Network Termination (NT) Unit 108. Multiple xTU devices ("all Transceiver Unit" devices) are further depicted. An xTU provides modulation for a DSL loop or line (e.g., DSL, ADSL, VDSL, etc.). In one embodiment, NT unit 108 includes an xTU-R (xTU Remote) 122 (for example, a transceiver defined by one of the ADSL or VDSL standards), or any other suitable network termination modem, transceiver or other communication unit. NT unit 108 also includes a Management Entity (ME) 124. Management Entity 124 may be any suitable hardware device, such as a microprocessor, microcontroller, or circuit state machine in firmware or hardware, capable of performing as required by any applicable standards and/or other criteria. Management Entity 124 collects and stores, among other things, operational data in its Management Information Base (MIB), which is a database of information maintained by each ME capable of being accessed via network management protocols such as Simple Network Management Protocol (SNMP), an administration protocol used to gather information from a network device to provide to an administrator console/program; via Transaction Language 1 (TL1) commands, TL1 being a long-established command language used to program responses and commands between telecommunication network elements; or via a TR-69 based protocol. "TR-69" or "Technical Report 069" is in reference to a DSL Forum technical specification entitled CPE WAN Management Protocol (CWMP) which defines an application layer protocol for remote management of end-user devices. XML or "eXtended Markup Language" compliant programming and interface tools may also be used.

Each xTU-R 122 in a system may be coupled with an xTU-C (xTU Central) in a Central Office (CO) or other central location. The xTU-C 142 is located at an Access Node (AN) 114 in Central Office (CO) 146. A Management Entity 144 likewise maintains an MIB of operational data pertaining to xTU-C 142. The Access Node 114 may be coupled to a broadband network 106 or other network, as will be appreciated by those skilled in the art. Each of xTU-R 122 and xTU-C 142 are coupled together by a U-interface/loop 112, which in the case of ADSL may be a twisted pair line, such as a telephone line, which may carry other communication services besides DSL based communications. Either Management Entity 124 or Management Entity 144 may implement and incorporate a management device 170 as described herein. The management device 170 may be operated by a service provider or may be operated by a third party, separate from the entity which provides DSL services to end-users. Thus, in accordance with one embodiment, the management device 170 is operated and managed by an entity which is separate and distinct from a telecommunications operator responsible for a plurality of digital communication lines such as copper twisted pair telephone lines over which such telecommunication services are delivered to subscribers/customers. For instance, the management device may operate within the so called cloud as a cloud service provided by a third party distinct from the communications system operator or the service provider for the communications system.

Several of the interfaces shown in FIG. 1 are used for determining and collecting operational data. The Q interface 126 provides the interface between the Network Management System (NMS) 116 of the operator and Management Entity 144 in Access Node 114. Parameters specified in the G.997.1 standard apply at the Q interface 126. The near-end parameters supported in Management Entity 144 may be derived from xTU-C 142, while far-end parameters from xTU-R 122 may be derived by either of two interfaces over the U-interface. Indicator bits and EOC messages may be sent using embedded channel 132 and provided at the Physical Medium Dependent (PMD) layer, and may be used to generate the required xTU-R 122 parameters in Management Entity 144. Alternately, the Operations, Administration and Maintenance (OAM) channel and a suitable protocol may be used to retrieve the parameters from xTU-R 122 when requested by Management Entity 144. Similarly, the far-end parameters from xTU-C 142 may be derived by either of two interfaces over the U-interface. Indicator bits and EOC message provided at the PMD layer may be used to generate the required xTU-C 142 parameters in Management Entity 124 of NT unit 108. Alternately, the OAM channel and a suitable protocol may be used to retrieve the parameters from xTU-C 142 when requested by Management Entity 124.

At the U-interface (also referred to as loop 112), there are two management interfaces, one at xTU-C 142 (the U-C interface 157) and one at xTU-R 122 (the U-R interface 158). The U-C interface 157 provides xTU-C near-end parameters for xTU-R 122 to retrieve over the U-interface/loop 112. Similarly, the U-R interface 158 provides xTU-R near-end parameters for xTU-C 142 to retrieve over the U-interface/loop 112. Interfaces V 156 and V-C 159 are further depicted within the CO 146 at different points of the loop 112. The parameters that apply may be dependent upon the transceiver standard being used (for example, G.992.1 or G.992.2). The G.997.1 standard specifies an optional Operation, Administration, and Maintenance (OAM) communication channel across the U-interface. If this channel is implemented, xTU-C and xTU-R pairs may use it for transporting physical layer OAM messages. Thus, the xTU transceivers 122 and 142 of such a system share various operational data maintained in their respective MIB s.

Management device 170 is depicted as operating at various optional locations and being capable of implementing improved techniques for upstream power control as described herein in accordance with several alternative embodiments. Management device 170 may be interfaced to a DSL communications system via broadband network 106, as is the case with embodiments where the management device 170 operates as a cloud based service via a third party provider distinct from the DSL operator responsible for the DSL communication components or the DSL services provider which sells Internet services to end-user subscribers. Management device 170 may be interfaced via the Network Management System (NMS) 116 and in yet another embodiment, management device 170 is connected with a NT unit 108 or with xTU-R 122 over the G-interface 159. In an alternative embodiment, the management device 170 operates at a CPE side, such as communicatively interfaced between a home network 104 (e.g. a LAN) and TE 102 and may optionally operate within TE 102 (e.g., within a CPE modem).

As used herein, the terms "user," "subscriber," and/or "customer" refer to a person, business and/or organization to which communication services and/or equipment are and/or may potentially be provided by any of a variety of service provider(s). Further, the term "customer premises" refers to the location to which communication services are being provided by a service provider. For an example Public Switched Telephone Network (PSTN) used to provide DSL services, customer premises are located at, near and/or are associated with the network termination (NT) side of the telephone lines. Example customer premises include a residence or an office building.

As used herein, the terms "user," "subscriber," and/or "customer" refer to a person, business and/or organization to which communication services and/or equipment are and/or may potentially be provided by any of a variety of service provider(s). Further, the term "customer premises" refers to the location to which communication services are being provided by a service provider. For an example Public Switched Telephone Network (PSTN) used to provide DSL services, customer premises are located at, near and/or are associated with the network termination (NT) side of the telephone lines. Example customer premises include a residence or an office building.

As used herein, the term "service provider" refers to any of a variety of entities that provide, sell, provision, troubleshoot and/or maintain communication services and/or communication equipment. Example service providers include a telephone operating company, a cable operating company, a wireless operating company, an internet service provider, or any service that may independently or in conjunction with a broadband communications service provider offer services that diagnose or improve broadband communications services (DSL, DSL services, cable, etc.).

Additionally, as used herein, the term "DSL" refers to any of a variety and/or variant of DSL technology such as, for example, Asymmetric DSL (ADSL), High-speed DSL (HDSL), Symmetric DSL (SDSL), and/or Very high-speed/Very high-bit-rate DSL (VDSL). Such DSL technologies are commonly implemented in accordance with an applicable standard such as, for example, the International Telecommunications Union (I.T.U.) standard G.992.1 (a.k.a. G.dmt) for ADSL modems, the I.T.U. standard G.992.3 (a.k.a. G.dmt.bis, or G.adsl2) for ADSL2 modems, I.T.U. standard G.992.5 (a.k.a. G.adsl2plus) for ADSL2+ modems, I.T.U. standard G.993.1 (a.k.a. G.vdsl) for VDSL modems, I.T.U. standard G.993.2 for VDSL2 modems, I.T.U. standard G.993.5 for DSL modems supporting Vectoring, I.T.U. standard G.998.4 for DSL modems supporting retransmission functionality, I.T.U. standard G.994.1 (G.hs) for modems implementing handshake, and/or the I.T.U. G.997.1 (a.k.a. G.ploam) standard for management of DSL modems.

References to connecting a DSL modem and/or a DSL communication service to a customer are made with respect to exemplary Digital Subscriber Line (DSL) equipment, DSL services, DSL systems and/or the use of ordinary twisted-pair copper telephone lines for distribution of DSL services, it should be understood that the disclosed methods and apparatus to characterize and/or test a transmission medium for communication systems disclosed herein may be applied to many other types and/or variety of communication equipment, services, technologies and/or systems. For example, other types of systems include wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, broadband power-line systems and/or fiber optic networks. Additionally, combinations of these devices, systems and/or networks may also be used. For example, a combination of twisted-pair and coaxial cable interfaced via a balun connector, or any other physical-channel-continuing combination such as an analog fiber to copper connection with linear optical-to-electrical connection at an Optical Network Unit (ONU) may be used.

The phrases "coupled to," "coupled with," "connected to," "connected with" and the like are used herein to describe a connection between two elements and/or components and are intended to mean coupled/connected either directly together, or indirectly, for example via one or more intervening elements or via a wired/wireless connection. References to a "communication system" are intended, where applicable, to include reference to any other type of data transmission system.

In the FIGS. 2A through 2G that follow there are described a variety of different groupings and configurations which may be accommodated through the described means for implementing upstream power controls for DSL system communications.

FIG. 2A illustrates an exemplary architecture 200 in which embodiments may operate. In particular, DSLAM 275 is shown connected with management device 170 via interface 230 or optionally connected with management device 170 via interface 230 through network 290 where the management device 170 operates remotely and is connected, for example, via the public internet or the cloud. Subscriber premises 250 are connected with the DSLAM 275 in which a first subset is connected via long loops 231 and a second sub-set is connected via short loops 232. The long loops 231 and short loops 232 traverse a common cable 235 and are affected by crosstalk 240. Element 226 showing an increasing distance from a DSLAM depicts that some of the subscriber premises are farther away from the DSLAM 275 and thus have longer loops than other subscriber premises 250.

Crosstalk 240 coupling is especially serious for upstream transmissions in which there is a mixture of long and short loops as depicted here due to the DSL upstream transmissions on short loops causing very strong crosstalk 240 coupling to DSL upstream transmissions on the long loops resulting in the near-far problem.

The problem for a DSL service provider or DSL operator is that higher data rates are required to service customers having subscribed to higher-tier (e.g., more expensive) service products, and as such, the service provider must conFIG. the lines so that the higher tier customers receive the level of service they have paid for while at the same time ensuring that lower tier subscribers continue to receive adequate data rates despite such rates being lower than the higher tier customers. Problematically, without upstream power control means, the short loops 232 will exhibit such strong crosstalk 240 coupling to the long loops 231 that it may not be possible to provide the subscriber premises 250 with a higher level tier of service, especially where higher tier subscribers are connected with longer DSL loops 231 than subscribers of a lower tier service product.

Despite having a mixture of both long and short DSL loops, the management device 170 described herein is capable of implementing upstream power control so as to improve communications on both the long and the short loops to the extent that higher tier services including faster data rates may be offered to subscriber premises 250 regardless of whether they are communicatively interfaced to the DSLAM 275 via the long loops 231 or the short loops 232.

FIG. 2B illustrates another exemplary architecture 201 in which embodiments may operate. The DSLAM 275, common cable 235, crosstalk, network 290, interface 230, and the management device remain. However, subscriber premises 250 have now been grouped into group A at element 234 with a long and a short loop and group B at element 233 also having a long and a short loop.

In such an embodiment, two or more groups of lines are served from a DSLAM 275 node, each of the groups having different lengths for their respective loops and each of the groups having different characteristics for their DSL lines/loops. The grouping may occur based on a variety of characteristics other than line length. Different characteristics can include: different frequency band-plan (e.g., the frequency usage), different DSL technology, equipment, standard profiles, protocols, different DSLAM line-cards, service tiers, and so forth. For instance, in one embodiment grouping occurs without regard to loop length possibly but not necessarily resulting in each group having both long and short loops (e.g., grouped according to service tiers, etc.).

FIG. 2C illustrates another exemplary architecture 202 in which embodiments may operate. In this embodiment there are depicted DSL lines which are grouped based at least in part on their loop lengths such that a first group has loops within a selected range of lengths and another group has loops within a different selected range of lengths. For instance long loops may be grouped together forming the group of long loops at element 237A and short loops may be grouped together forming the group of short loops at element 237B. Also, two groups are depicted here for the sake of simplicity but there may be more than two groups into which a plurality of DSL lines are sub-divided regardless of the characteristics which are used to form the groupings upon which to divide the plurality of lines.

FIG. 2D illustrates another exemplary architecture 203 in which embodiments may operate. In particular, there is depicted a group of vectored lines at element 239 coupled with the vectored DSLAM 276 and also a group of non-vectored lines at element 238. As can be seen from the figure, both the non-vectored group of lines and the vectored group of lines share the same common cable 235 resulting in the two distinct groups having crosstalk 240 between them. This crosstalk may be considered alien crosstalk 240, and as depicted, may originate from the group of non-vectored lines 238 and electromagnetically couple onto the group of vectored lines 239, negatively affecting the group of vectored lines 239 due to the crosstalk 240 being un-cancelled by the vectoring applied to the group of vectored lines. Although same-binder crosstalk is strongest, crosstalk between binders is significant in many cases and so vectoring often spans multiple binders within a single cable 235.

Grouping characteristics may thus include vectoring status, for instance, in which a first group contains vectored lines and a second group contains non-vectored lines. Other characteristics upon which groupings may be based include service products for the groups (e.g., higher tier vs. lower tier) or lines using a different band-plan and thus may be susceptible to differing ranges of crosstalk or require different power parameters to operate at the respective frequency bands utilized by each group, or based upon different capabilities of DSL equipment coupled with the DSL loops, such as vectoring capable equipment and non-vectoring capable equipment, or such as equipment using VDSL profile 8a and equipment using VDSL profile 8b.

If no upstream power control were applied to the loops of either group then the long lines may suffer from very low upstream rates because of strong crosstalk from the short loops which then leads to a very "unfair" rate distribution. Moreover, even if power controls are applied to the lines but there is no differentiation made between the different groups of lines then customers in a first group with an expensive service product may get the same or inferior rates relative to the customers in a second group with the less expensive product.

Failing to differentiate between groups of lines may also undermine the benefits of vectoring. For instance, data rates of vectored lines in a first group may remain poor, notwithstanding the vectoring capabilities, due to crosstalk from short non-vectored loops in a second group, thus wasting the expense of provisioning the more advanced vectoring capable equipment (e.g., DSLAMs, line cards, CPE modems, etc.).

Conventional upstream power management techniques have applied the same "upstream power back-off" strategy across all twisted pair DSL lines/loops by utilizing the same parameters across an entire population of DSL lines without differentiation. Such a technique does improve the rates of long loops, and provides a more "fair" distribution of rates among long and short loops overall. However, the common "upstream power back-off" strategy is less than ideal because there remains no differentiation between two groups of lines, and as such, the problems described above remain. For instance, it may be necessary to provide higher rates to higher tier and higher paying subscribers regardless of whether they happen to be connected to the DSLAM 275 via a longer or shorter loop and such differentiation cannot be accomplished utilizing a conventional technique which applies the same upstream power back-off to all lines.

Another solution, therefore, is to determine and then apply an "optimum spectrum balancing" for every one of a plurality of DSL lines. Such an approach is not utilized in the conventional arts outside of simulation or laboratory conditions because it is extremely complex to determine the optimal upstream rate and power distribution for each line which in turn translates to very high computational demands which may not be feasible to fulfill for large-scale deployments of DSL service provider networks. The complexity results from the wide array of differing solutions that require modeling based upon the exact loop topology for a particular deployment and the necessity to solve for complex mathematical relationships among the many loops and their respective characteristics. Computational requirements for network management hardware, management bandwidth and DSL equipment data, and control interfaces to solve for this level of complexity would be cost prohibitive to a DSL system operator.

Further depicted are the vector capable CPEs 251 and non-vectored DSL communications to the non-vector capable CPEs at element 252. In this embodiment, the vectored DSLAM 276 is connected to all lines (238 and 239) in the area. One set of lines are connected to vector-capable CPEs resulting in the group of vectored lines 239 and the remaining lines are connected to non-vector-capable CPEs resulting in the group of non-vectored lines 238. Here the characteristic utilized to divide the plurality of lines into groups is therefore vectoring capability of the respective CPE at the subscriber premises 250. The group of non-vectored lines 238 results in strong crosstalk 240 coupling onto the transmissions of the group of vectored lines 239 and this crosstalk is not canceled as it is received as alien crosstalk from a source outside of the group of vectored lines 239. The group of vectored lines 239 also exhibits crosstalk coupling onto transmissions of the group of non-vectored lines 238. Such crosstalk coupling reduces downstream and upstream transmission rates of the group of vectored lines 239 relative to the case where there are no lines outside of the group of vectored lines 239.

Thus, the management device 170 applies upstream power control techniques using different upstream power control parameters for the different groups of lines.

Figure 2E:
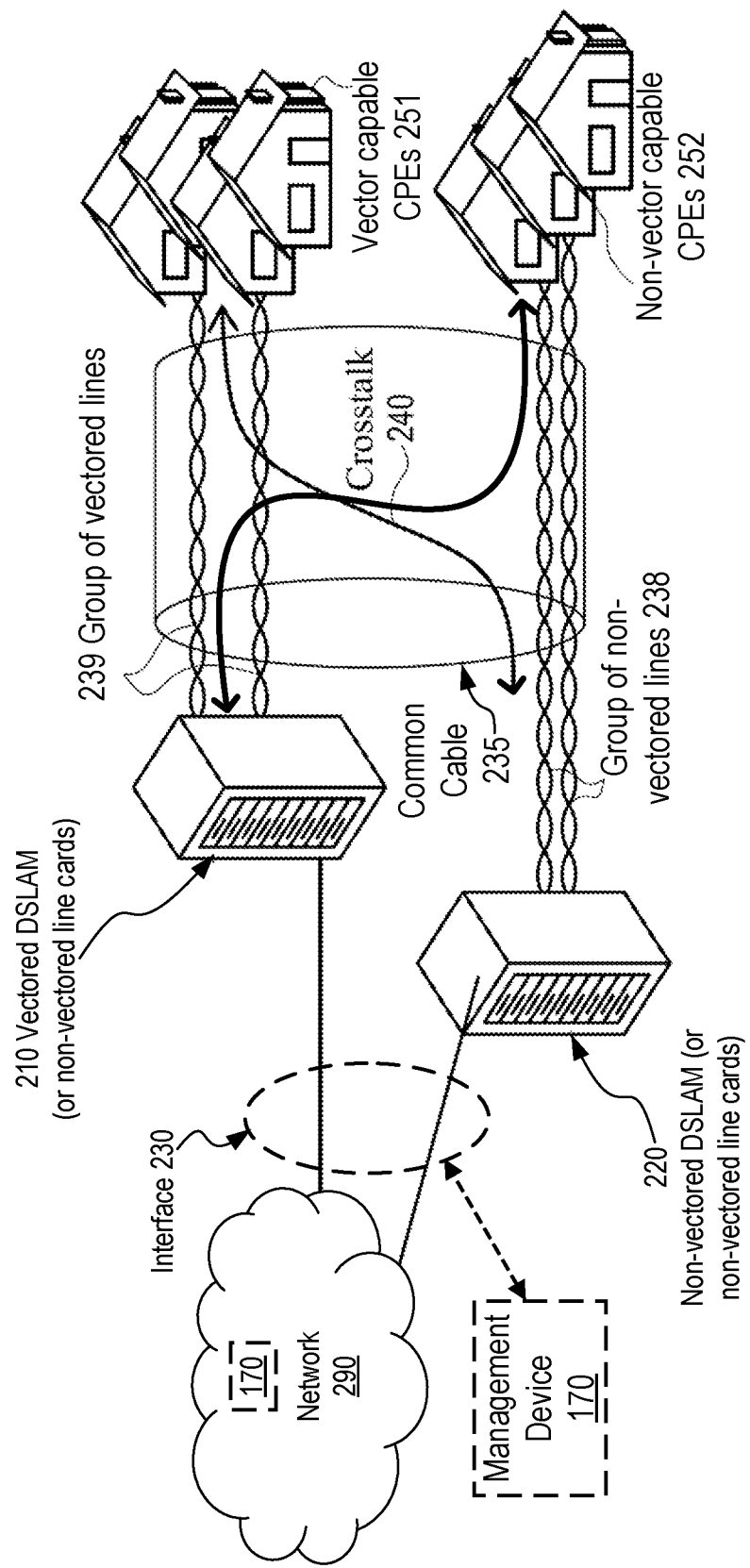
FIG. 2E illustrates another exemplary architecture within which embodiments may operate.

FIG. 2E illustrates another exemplary architecture 204 in which embodiments may operate. In particular, there are both a vectored DSLAM 210 and a non-vectored DSLAM 220 or alternatively non-vectored line cards (e.g., where DSLAMs 210 and 220 are embodied by separate line cards within a single DSLAM). The vectored DSLAM 210 services the vector capable CPEs 251 via the group of vectored lines 239 and the non-vectored DSLAM services the non-vector capable CPEs 252 via the group of non-vectored lines 238.

As before, the group of non-vectored lines 238 create strong crosstalk for the transmissions on the group of vectored lines 239, and vice versa. The crosstalk reduces the downstream and upstream transmission rates of the vectored lines relative to the case where no non-vectored lines existed, or where the non-vectored lines were actually vectored.

Service providers must plan for services that can be offered to customers and part of such planning is the ability to know what transmission rates can feasibly be offered and provided to a customer. Having non-vectored lines neighboring vectored lines makes it difficult to predict the transmission rates of the vectored lines and yet at the same time, it may be impractical for the service provider to separate vectored pairs of lines from non-vectored pairs, for instance, due to such lines being common to the same binder or a common cable 235. As with the preceding examples, it is further impractical to change the distance from which a DSL services subscriber is located from a DSLAM and it may be impractical to control which DSL subscribers in a geographic area have vectoring capable CPEs versus non-vectoring capable CPEs. For example, some customers may not wish to upgrade their CPE modem and it would be wasteful for the DSL service provider to provision vectoring capable CPE modems to those customers who choose not to upgrade and thus retain a lower tier service plan which is presumably provided at a lower subscription rate.

FIG. 2E illustrates another exemplary architecture 205 in which embodiments may operate. In particular, DSL lines 211 are depicted in additional detail, broken down into two distinct groups in this particular example. Specifically, there is a first subset of the DSL lines 211 that are vectored lines and thus constitute a first group 212 and there is a second subset of the DSL lines 211 that are not in the vectored group and thus constitute a second group 213. A plurality of lines may also be divided according to other characteristics such as tier plan, line length, frequency band plan, etc.

Management device 170 is depicted as being communicatively interfaced with the plurality of DSL lines 211 through the interface to the DSL lines at element 214. For instance, the interface may traverse through transceivers, CPE modems, DSLAMs, or other equipment so as to provide a communications interface between the DSL lines and the management device 170 such that the management device 170 is capable to collect operational data 216 from the DSL lines 211 and additionally issue or send optimization instructions 218 including, for example, configuration changes, to the DSL lines 211 as depicted by the information flow elements between the DSL lines 211 and the management device 170. Such optimization instructions 218 may specify different upstream power control parameters for each of the two groups or different instructions for more than two groups where the management device divides a plurality of lines into more than a first and a second group.

FIGS. 3 and 4 depict flow diagrams illustrating methods 300 and 400 for implementing and using improved upstream power control schemes for DSL communications in accordance with described embodiments. Methods 300 and 400 may be performed by processing logic that may include hardware (e.g., circuitry, dedicated logic, programmable logic, microcode, etc.), software (e.g., instructions run on a processing device to perform various operations such as interfacing, managing, receiving, controlling, analyzing, collecting, generating, monitoring, diagnosing, or some combination thereof). In one embodiment, one or both of methods 300 and 400 are performed or coordinated via an apparatus such as that depicted at element 170 of FIG. 1. Some of the blocks and/or operations listed below are optional in accordance with certain embodiments. The numbering of the blocks presented is for the sake of clarity and is not intended to prescribe an order of operations in which the various blocks must occur.

FIG. 3 depicts a process flow for method 300 beginning with block 305 having processing logic for specifying a maximum loop length of group A and maximum loop length of group B. Alternatively, processing may specify a range of acceptable loop lengths into which a plurality of loops are divided so as to form the group A and group B sub-sets. Other grouping considerations are also permissible as is described above.

At block 310, processing logic specifies an expected number of lines in group A (N1) and expected number of lines in group B (N2). According to one embodiment, channel, crosstalk, and noise models are selected so as to enable DSL modeling and estimation so that the lines may be characterized and modeled sufficient to enable upstream rates to be specified and the corresponding upstream power control parameters identified to achieve the specified rates. Known standardized models may be utilized or specialized models may be constructed based on lab or field observations. The expected number of lines for the respective groups may then be provided to the chosen models input as parameters.

At block 315, processing logic specifies an upstream rate of the lines in group B. For instance, the upstream rate for the lines in the group may be mandated by equipment capabilities, mandated by a DSL system operator and thus outside of the control of the management device 170, the upstream rate may be specified so as to fulfill a required subscriber tier level (e.g., 15 mbps, 50 mbps, etc.), or selected based on other considerations available to a management device implementing the upstream power control scheme.

At block 320, processing logic identifies upstream power control parameters for the lines in group B. For instance, using the modeling conducted based on the channel and crosstalk and noise models selected; processing logic may identify upstream power control parameters to fulfill the specified data rate. In one embodiment upstream power control parameters of lines in group B are identified by assuming N1+N2 pairs of group B at a maximum loop length for group B to determine the upstream power control parameters necessary to achieve the specified upstream rate for the lines in group B. Processing may further identify a maximum upstream rate for the lines of group A which is feasible based on the modeling given the data rate specified for group B.

At block 325, processing logic identifies upstream power control parameters for the lines in group A. For instance, the upstream power parameters for group A may be further identified so as to attain the maximum upstream rate determined for group A. In such a way, the data rate of group A may be maximized but subjected first to the specified data rate of group B. Such a technique may be helpful where group A constitutes lines operating at a higher price-tier than the lines of group B and must therefore conform to the specified data rates, where as the remaining lines of group B should simply be maximized for the sake of ensuring optimal customer satisfaction but do not necessarily require any particular data rate or require a rate which is lower than that of group A. In such a way, processing is able to maximize the data rate for the group having preference (e.g., due to a higher priced service tier, etc.) while keeping a promised level of service for the non-preferred group (e.g., other lines associated with a lower priced service tier, etc.). Such performance trade-offs to the benefit of the preferred group may be obtained by varying the promised level of service for non-preferred group.

As with the data rate for group B, the data rate and corresponding upstream power control parameters may also be based upon the modeling or based on other estimation techniques familiar to the DSL arts.

Such a technique is further advantageous as a set of upstream power back-off (UPBO) parameters may be determined separately for each for each of the distinct groups, for instance, groups A and B from the preceding example. In such a way, different UPBO settings may be applied to distinct groups having disparate characteristics, something which is not feasible with conventionally available techniques. Having different UPBO settings is also less computationally intensive to calculate than determining UPBO settings for every line individually and is less complex to implement onto the operating DSL lines than individual settings for every line, assuming such solutions could be determined. Other upstream power control parameters may be used in place of UPBO settings or in addition to UPBO settings.

In one embodiment, certain assumptions may be made as to the lines of the different groups. For example, computational complexity may be reduced by assuming a worst-case length for each group, for instance, by assigning an assumed length equal to or approximating a DSL line in a group having the longest length, and then utilizing this assumed length for all DSL lines in the same group. By assuming equal lengths for DSLs in a group, the optimization problem is greatly simplified, because the optimization space is reduced, and a solution is only needed for each group, instead of a solution for each line. Although an assumed length is utilized which may not concur with actual lengths for some of the DSL lines in a group, testing of such a technique has shown that data rate performance is very close to that which is achieved by an optimal spectrum balancing technique in which individual upstream power control parameters are determined for every single line individually. Thus, computational efficiency is realized while still benefiting from the improved data rate performance of more complex optimization techniques which may be infeasible for DSL components provisioned to the field. Other characteristics may also be assumed in addition to or in place of assuming line length.

It was discovered through testing and experimentation that the complexity of solving for many DSL lines of differing line lengths can be greatly reduced through the described grouping and making certain assumptions about the lines despite these assumptions not necessarily being true for all lines in a particular group. For instance, determining an optimal solution for all lines in a population having different line lengths is so computationally complex that it can only be solved in a laboratory environment and not for large-scale DSL deployments in the field. However, assuming that all lines in a first group have a first assumed maximum length and assuming all lines in a second group have a second assumed maximum length reduces the complexity of the solution to the point that typical field deployment components possess sufficient computational resources. Despite these assumptions, it was discovered that for two groups a solution can be attained which is virtually 100% as good as the optimal solution computed based on actual loop lengths for every one of the population of DSL lines. For more than two groups a solution of approximately 92% to 95% as good as the optimal solution is attainable through the described techniques.

Utilizing assumed values was a non-intuitive approach to solving the problem because providing inaccurate input for some of the DSL lines to a model or DSL estimation means would presumably render garbage or inaccurate results due to the mathematical relationships between the various lines based on their inputs to the modeling or estimation means being corrupted or falsified. Yet, through the grouping schemes described, near optimal solutions can nevertheless be attained with far less complexity providing an unexpected benefit and result of the described approach.

At block 330, processing logic applies the upstream rates and power control parameters to the respective lines of both groups A and B. For example, optimization instructions may be sent to DSL equipment such as CPE modems, DSLAMs, line cards, etc., instructing the equipment to adopt the upstream rates and power control parameters established above.

FIG. 4 presents an alternative processes flow for method 400 which begins with block 405 having processing logic for dividing a plurality of DSL lines into a first group of DSL lines and a second group of DSL lines based on characteristics common to each of the DSL lines within the respective first and second groups.

At block 410, processing logic determines attainable upstream data rates for the first and second groups of DSL lines.

At block 415, processing logic selects upstream power control parameters to apply to each of the first and second groups of DSL lines based on the attainable upstream data rates determined.

At block 420, processing logic instructs the DSL lines of the first and second groups to adopt the selected upstream power control parameters.

A variety of alternative method flows may also be utilized in accordance with the described embodiments. For example, in one alternative method flow, operations include dividing a plurality of DSL lines into a first group of DSL lines and a second group of DSL lines based on characteristics common to each of the DSL lines within the respective first and second groups; modeling the first and second groups of DSL lines to determine data rates attainable for each of the first and second groups and corresponding upstream power parameters required to attain the data rates on the first and second groups respectively; selecting a first data rate to apply to the first group of DSL lines based on the data rates attainable as determined by the modeling; and selecting a second data rate to apply to the second group of DSL lines based on the data rates attainable as determined by the modeling, in which the second data rate for the second group is different than the first data rate for the first group; and instructing the DSL lines of the first and second groups to adopt the corresponding power parameters required to attain the selected first and second data rates respectively, in which different power parameters are specified for each of the first and second groups of DSL lines.

In another alternative embodiment operations in a Digital Subscriber Line (DSL) communications system having a plurality of DSL lines, include: dividing the plurality of DSL lines into a first group of DSL lines and a second group of DSL lines based on characteristics of the respective plurality of DSL lines; assigning a first assumed loop length to all of the DSL lines of the first group; assigning a second assumed loop length to all of the DSL lines of the second group; estimating a maximum upstream data rate for each of the first and second groups of DSL lines using the first and second assumed loop lengths respectively; identifying maximum upstream power parameters required to attain the estimated maximum upstream data rate for each of the first and second groups of DSL lines; and applying the maximum upstream power parameters identified to the DSL lines of the first and second groups of DSL lines.

In another alternative embodiment operations in a Digital Subscriber Line (DSL) communications system having a plurality of DSL lines therein includes: dividing the plurality of DSL lines into two or more groups of DSL lines based on characteristics of the respective plurality of DSL lines; in which processing for each of the two or more groups of DSL lines includes at least: (i) assigning an assumed loop length to all of the DSL lines within each respective group, (ii) estimating a maximum upstream data rate for each respective group of DSL lines, (iii) identifying maximum upstream power parameters required to attain the estimated maximum upstream data rate for each respective group of DSL lines, and (iv) applying the maximum upstream power parameters identified to the DSL lines of the first and second groups of DSL lines.

In yet another alternative embodiment, operations include: dividing a plurality of DSL lines into a first group of DSL lines and a second group of DSL lines based on characteristics common to each of the DSL lines within the respective first and second groups; modeling the first and second groups of lines using a first assumed loop length for the DSL lines of the first group and using a second assumed loop length for the DSL lines of the second group; estimating a maximum upstream data rate for each of the first and second groups of DSL lines based on the modeling; identifying maximum upstream power parameters required to attain the estimated maximum upstream data rate for each of the first and second groups of DSL lines; and instructing the DSL lines of the first and second groups of DSL lines to adopt the maximum upstream power parameters identified.

In accordance with a particular embodiment, the method 400 further includes: prioritizing the first group of DSL lines over the second group of DSL lines; and in which selecting upstream power control parameters to apply to each of the first and second groups of DSL lines includes selecting upstream power control parameters to enable an upstream data rate by the first group of DSL lines which is greater than an upstream data rate by the second group of DSL lines.

In accordance with one embodiment of method 400, determining attainable upstream data rates for the first and second groups of DSL lines includes modeling the first and second groups of DSL lines and determining the attainable upstream data rates based on the modeling.

In accordance with another embodiment of method 400, modeling includes estimating a maximum upstream data rate for each of the first and second groups of DSL lines and estimating corresponding power parameters to attain the maximum upstream data rates for the first and second groups respectively.

In accordance with another embodiment of method 400, the modeling further includes: assigning a first assumed loop length to all of the DSL lines of the first group; assigning a second assumed loop length to all of the DSL lines of the second group; and modeling the first and second groups of DSL lines to determine data rates attainable for each of the first and second groups using the first and second assumed loop lengths respectively, in which the modeling operates without regard to actual loop lengths of the plurality of DSL lines.

In accordance with another embodiment of method 400, the modeling further includes: identifying a maximum loop length among all the lines of the first group; identifying a maximum loop length among all the lines of the second group; and modeling the first and second groups of lines using the maximum loop length of the first group as an assumed loop length for all lines in the first group without regard to actual line lengths of the first group of lines and further using the maximum loop length of the second group as an assumed loop length for all lines in the second group without regard to actual line lengths of the second group of lines.

In accordance with a particular embodiment, the method 400 further includes: receiving as input for one or more models utilized by the modeling operations: an expected quantity of lines for the second group, an expected quantity of lines for the second group, or an expected quantity of lines for each of the first and the second groups. In an alternative embodiment, a ratio of lines may be utilized rather than a quantity, and thus, the inputs may include a ratio of an expected quantity of lines for the first group or the second group based on an expected quantity of lines provided for the second group or the first group respectively.

In accordance with a particular embodiment, the method 400 further includes: prioritizing the first group of lines to operate at an upstream data rate which is greater than the second group of lines by: (a) specifying an upstream data rate for the first group of lines over a minimum performance threshold; and (b) restricting an upstream data rate for the second group of lines as necessary to enable the first group of lines to operate at the specified upstream data rate for the first group of lines while the second group of lines operate simultaneously at the restricted upstream data rate. For example, operational performance of the second group of DSL lines may be sacrificed to some extent by restricting the data rate of the second group in preference to the prioritized first group by exploiting the tradeoff performance relationship between the two groups.

In accordance with another embodiment of method 400, the modeling further includes: determining a maximum upstream data rate for the lines of the prioritized first group by modeling the first and second groups of lines based on the restricted upstream data rate for the second group; and in which restricting the lines of the second group includes assigning restrictions based on the modeling which are configured to permit the prioritized first group to operate at the specified upstream data rate simultaneously with the second group of lines operating at the restricted upstream data rate according to the modeling.

In accordance with another embodiment of method 400, dividing a plurality of DSL lines into a first group of DSL lines and a second group of DSL lines based on characteristics common to each of the DSL lines within the respective first and second groups includes one of the following groupings: (i) the first group of lines having vectored lines and the second group of lines having non-vectored lines; (ii) the first group of lines being coupled with vectoring capable CPE modems and the second group of lines being coupled with non-vectoring capable CPE modems; (iii) the first group of lines being coupled with a first equipment type and the second group of lines being coupled with a second equipment type; (iv) the first group of lines having line lengths of a threshold range greater than the lines of the second group; (v) the first group of lines having line lengths less than a first maximum threshold line length and the second group of lines having line lengths greater than or equal to a second maximum threshold line length; (vi) the first group of lines utilizing a frequency range transmission plan different than the lines of the second group; (vii) the first group of lines being associated with subscribers of a higher priced subscription tier than subscribers associated with the lines of the second group; (viii) the first group of lines being associated with subscribers of contractually promised a higher upstream data rate than subscribers associated with the lines of the second group; and (ix) the first group of lines being associated with subscribers of a DSL service product different than subscribers associated with the lines of the second group.

In accordance with another embodiment of method 400, selecting upstream power control parameters includes: determining the upstream power control parameters for the lines of the second group by identifying upstream power back-off parameters that achieve a maximum upstream data rate for the lines of the second group; and determining the upstream power control parameters for the lines of the first group by identifying upstream power back-off parameters that achieve a maximum upstream data rate for the lines of the first group without negatively affecting the maximum upstream data rate for the lines of the second group when both the first and second groups of lines simultaneously operate at their respective maximum upstream data rates.

In accordance with a particular embodiment, the method 400 further includes: establishing an operational interface to a communications system, the communications system having the plurality of DSL lines therein; in which the plurality DSL lines include a plurality of DSL transmission lines, DSL loops, copper telephone lines, or twisted pair telephone lines, the plurality of DSL lines carrying DSL communication signals; and further in which the plurality of DSL lines are compatible with at least one of the following DSL protocols: ADSL, VDSL, VDSL2, vectored VDSL2, and G.fast.

In accordance with another embodiment of method 400, selecting upstream power control parameters includes: selecting a different upstream power back off parameter for each of the first group of lines and the second group of lines; selecting one or more additional parameters to apply to each of the first and second groups of lines, the parameters selected from the group including: a target bit rate, a range of target bit rates, a maximum bit rate, transmit power, a range of transmit powers, a Power Spectral Density (PSD) mask, a target noise margin, a maximum noise margin, a carrier mask, and transmit passbands defining a set of frequencies over which data is transmitted; and further in which the additional parameters selected are different for each of the first and second groups of lines.

In accordance with another embodiment of method 400, in which selecting upstream power control parameters comprises: identifying performance tradeoffs to each of the first and second groups such that improved performance to the first group is accompanied by degraded performance of the second group and visa-versa; and in which the method 400 further includes prioritizing performance of the first group over the second group to achieve an attainable upstream data rate for the first group over a specified threshold or prioritizing performance of the first group over the second group to maximize an attainable upstream data rate for the first group.

In accordance with another embodiment of method 400, determining attainable upstream data rates for the first and second groups of DSL lines includes estimating achievable performance targets for each of the first and second groups by performing the at least one of the following operations: (i) modeling a general estimation for an entire regional loop plant encompassing the plurality of DSL lines based upon statistical properties for the entire regional loop plant without requiring per-line statistics for the plurality of DSL lines constituting the first and second groups; (ii) modeling a specific knowledge estimation for the plurality of DSL lines based upon per-line statistics for each the plurality of DSL lines including statistics for the plurality of DSL lines selected from one or more of: a quantity of lines, cable and binder assignments for the lines, line lengths, crosstalk coupling levels amongst the lines, background noise levels affecting the lines, and exposure length defined as a part of the cable which is shared by the lines first group and the lines of the second group through which crosstalk coupling occurs; and (iii) modeling a performance based estimation based on operational performance of the plurality of DSL lines or operational capabilities for equipment associated with the plurality of DSL lines, or both.

In accordance with another embodiment of method 400, determining attainable upstream data rates for the first and second groups of DSL lines includes estimating at least Far end crosstalk (FEXT) coupling for each of the plurality of DSL lines according to estimated received FEXT power for the respective line, where higher received FEXT power is indicative of stronger FEXT coupling into other lines among the plurality of DSL lines than lines associated with lower received FEXT power.

In accordance with another embodiment of method 400, selecting upstream power control parameters to apply to each of the first and second groups of DSL lines based on the attainable upstream data rates determined, includes one or more of: weighting one or more of the selected upstream power control parameters according to service levels for users in the first and second groups of lines; applying target bit rates and SNR (Signal-To-Noise) margin targets to the lines in the first group, the second group, or both the first and second groups; applying an upstream power back-off (UPBO) to the lines in the first group, the second group, or both the first and second groups; applying a waterfilling criterion to determine bit-loadings and transmit Power Spectral Densities (PSDs) to the lines in the first group, the second group, or both the first and second groups; and coordinating assignment of the selected upstream power control parameters with a centralized management system associated with a communications system within which the DSL lines operate to match the selected upstream power control parameters to be sent to the DSL lines via instructions.

In accordance with a particular embodiment, the method 400 further includes: collecting operational data from the plurality of DSL lines; and further in which the determining attainable upstream data rates for the first and second groups of DSL lines is based at least in part on the operational data collected.

According to one embodiment, there is a non-transitory computer readable storage medium or a computer program product having instructions stored thereon that, when executed by a processor in a management device, the instructions cause the management device to perform operations including: dividing a plurality of DSL lines into a first group of DSL lines and a second group of DSL lines based on characteristics common to each of the DSL lines within the respective first and second groups; determining attainable upstream data rates for the first and second groups of DSL lines according to the characteristics of each group; selecting upstream power control parameters to apply to each of the first and second groups of DSL lines based on the attainable upstream data rates determined; and instructing the DSL lines of the first and second groups to adopt the selected upstream power control parameters.

In a particular embodiment, the instructions of the non-transitory computer readable storage medium or a computer program product enable a management device to perform any of the operations carried out by method 300, method 400, and the related embodiments for such methods.

Figure 5:
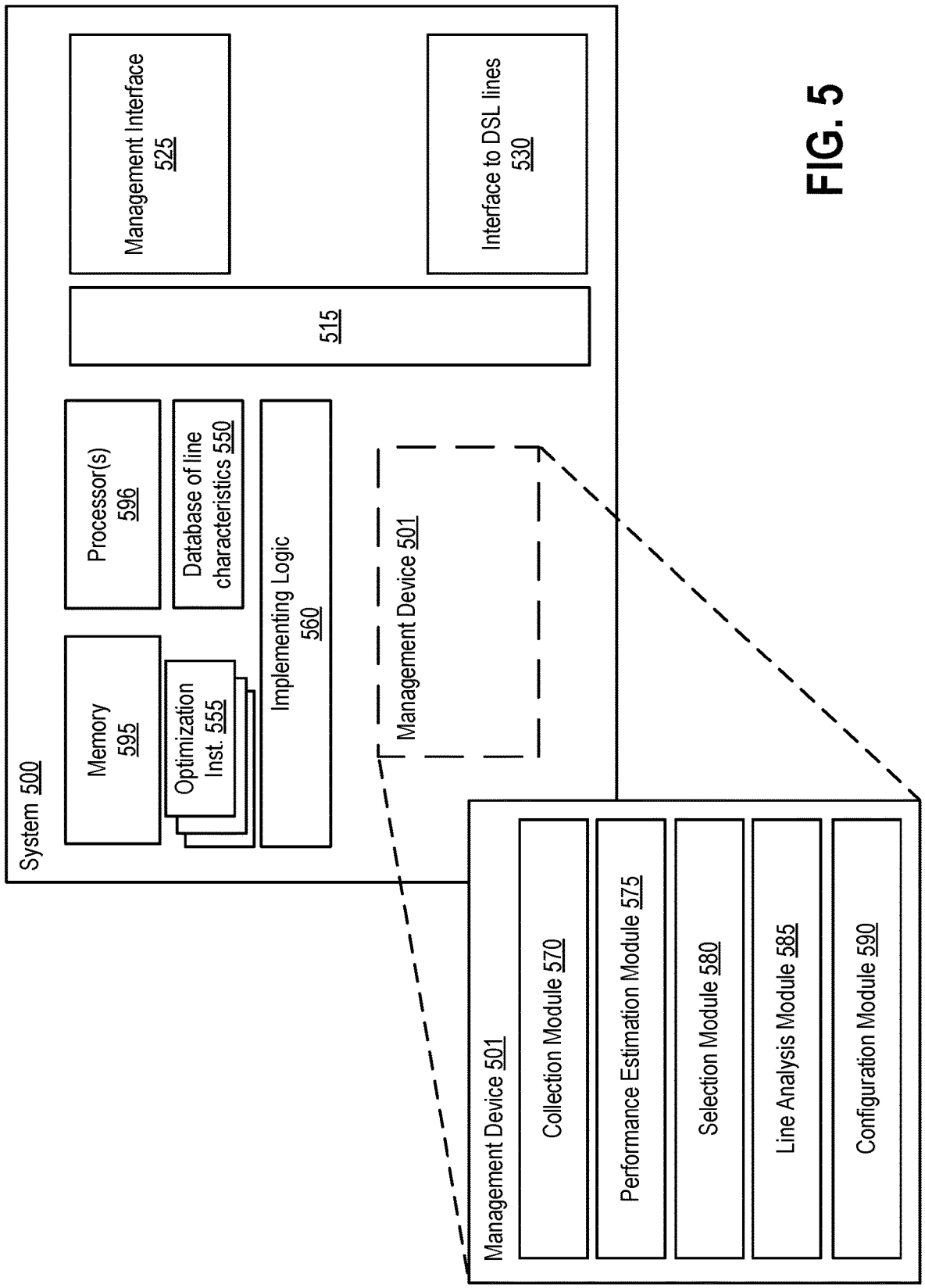
FIG. 5 illustrates a diagrammatic representation of a system in accordance with which embodiments may operate, be installed, integrated, or configured.

FIG. 5 illustrates a diagrammatic representation of a system 500 in accordance with which embodiments may operate, be installed, integrated, or configured.

In one embodiment, system 500 includes a memory 595 and a processor or processors 596. For example, memory 595 may store instructions to be executed and processor(s) 596 may execute such instructions. Processor(s) 596 may also implement or execute implementing logic 560 having logic to implement the methodologies discussed herein. System 500 includes communication bus(es) 515 to transfer transactions, instructions, requests, and data within system 500 among a plurality of peripheral devices communicably interfaced with one or more communication buses 515. System 500 further includes management interface 525, for example, to receive requests, return responses, and otherwise interface with network elements located separately from system 500.

In some embodiments, management interface 525 communicates information via an out-of-band connection separate from DSL line based communications, where "in-band" communications are communications that traverse the same communication means as payload data (e.g., content) being exchanged between networked devices and where "out-of-band" communications are communications that traverse an isolated communication means, separate from the mechanism for communicating the payload data. An out-of-band connection may serve as a redundant or backup interface over which to communicate control data between the system 500 and other networked devices or between the system 500 and a third party service provider.

System 500 further includes an interface to the DSL lines 530 to communicate information via a LAN based connection, to monitor the DSL lines, DSL loops, DSL twisted pairs, copper telephone lines, and Digital communication lines which are interfaced to system 500. System 500 further includes a database of line characteristics 550 that may be analyzed or referenced when conducting analysis such as performance estimation, modeling, and predictions as well as selection of upstream power control parameters, power back off settings, and other functions. System 500 may further include multiple optimization instructions 555, any of which may be initiated responsive to analysis of the connected DSL lines. For example, corrective actions, additional diagnostics, information probes, configuration change requests, local commands, remote execution commands, and the like may be specified by and triggered as optimization instructions 555. The database of line characteristics 550 and the optimization instructions 555 may be stored upon a hard drive, persistent data store, a database, or other storage location within system 500.

Distinct within system 500 is management device 501 which includes collection module 570, performance estimation module 575, selection module 580, line analysis module 585, and a configuration module 590. Management device 501 may be installed and configured in a compatible system 500 as is depicted by FIG. 5, or provided separately so as to operate in conjunction with appropriate implementing logic 560 or other software.

In accordance with one embodiment there is a system having a processor 596 and a memory 595 therein, in which the system 500 further includes: an interface 525 to a communications system, the communications system having a plurality of DSL lines; a line analysis module 585 to divide the plurality of DSL lines into a first group of DSL lines and a second group of DSL lines based on characteristics common to each of the DSL lines within the respective first and second groups; a performance estimation module 575 to determine attainable upstream data rates for the first and second groups of DSL lines according to the characteristics of each group; a selection module 580 to select upstream power control parameters to apply to each of the first and second groups of DSL lines based on the attainable upstream data rates determined; and a configuration module 590 to instruct the DSL lines of the first and second groups to adopt the selected upstream power control parameters, for instance by communicating with the plurality of DSL lines of the first and second groups via the interface to the DSL lines 530.

In accordance with another embodiment, the system 500 may further include a collection module 570 to collect operational data from the plurality of DSL lines of the first and second groups. In such an embodiment, the performance estimation module 575 is to estimate a maximum upstream data rate for each the first and second groups of lines based at least in part on the operational data collected via the collection module 570 of the management device 501.

According to another embodiment, the system 500 operates as a server of a cloud service provider physically remote from a Customer Premises Equipment (CPE) modem at a business or residence of a DSL subscriber associated with one of the plurality of DSL lines and physically remote from a Central Office (CO) which provides communication services to the CPE modem; and further in which the configuration module is to instruct the DSL lines of the first and second groups is to conFIG. a transceiver of the CPE modem using the selected upstream power control parameters.

FIG. 6 illustrates a diagrammatic representation of a machine 600 in the exemplary form of a computer system, in accordance with one embodiment, within which a set of instructions, for causing the machine 600 to perform any one or more of the methodologies discussed herein, may be executed. In alternative embodiments, the machine may be connected, networked, interfaced, etc., with other machines in a Local Area Network (LAN), a Wide Area Network, an intranet, an extranet, or the Internet. The machine may operate in the capacity of a server or a client machine in a client-server network environment, or as a peer machine in a peer-to-peer (or distributed) network environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 618 (e.g., a persistent storage device including hard disk drives and persistent database implementations), which communicate with each other via a bus 630. Main memory 604 includes information and instructions and software program components necessary for performing and executing the functions with respect to the various embodiments of the systems, methods, and management device as described herein. Optimization instructions 623 stored within main memory 604 may be triggered based on, for example, analysis of collected operational data, known line statistics, known equipment capabilities and limitations, and so forth. Main memory further includes channel, crosstalk, and noise models 624 according to this embodiment which are stored within main memory 604 for use in estimating and predicting operational characteristics of the lines undergoing evaluation. Main memory 604 and its sub-elements (e.g. 623 and 624) are operable in conjunction with processing logic 626 and/or software 622 and processor 602 to perform the methodologies discussed herein.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute the processing logic 626 for performing the operations and functionality which is discussed herein.

The computer system 600 may further include one or more network interface cards 608 to communicatively interface the computer system 600 with one or more networks 620 from which information may be collected for analysis. The computer system 600 also may include a user interface 610 (such as a video display unit, a liquid crystal display (LCD), or a cathode ray tube (CRT)), an alphanumeric input device 612 (e.g., a keyboard), a cursor control device 614 (e.g., a mouse), and a signal generation device 616 (e.g., an integrated speaker). The computer system 600 may further include peripheral device 636 (e.g., wireless or wired communication devices, memory devices, storage devices, audio processing devices, video processing devices, etc.). The computer system 600 may perform the functions of a management device 634 capable of interfacing with digital communication lines such as copper telephone lines within a vectored and non-vectored groups, monitoring, collecting, analyzing, and reporting information, and initiating, triggering, and executing various optimization instructions 623 including the execution of commands and instructions to alter characteristics and operation of vectoring mechanisms and those lines associated with vectoring deployments.

The secondary memory 618 may include a non-transitory machine-readable storage medium (or more specifically a non-transitory machine-accessible storage medium) 631 on which is stored one or more sets of instructions (e.g., software 622) embodying any one or more of the methodologies or functions described herein. Software 622 may also reside, or alternatively reside within main memory 604, and may further reside completely or at least partially within the processor 602 during execution thereof by the computer system 600, the main memory 604 and the processor 602 also constituting machine-readable storage media. The software 622 may further be transmitted or received over a network 620 via the network interface card 608.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A computer-implemented method comprising:
    assigning a first set of loop lengths to a first group of DSL lines and a second set of loop lengths to a second group of DSL lines;
    for a first group of DSL lines, identifying a first set of power control parameters that enable a first upstream rate, the first set of power control parameters being subject to at least one of a given set of criteria for the second group of DSL lines or a second set of power control parameters for the second group of DSL lines; and
    applying the first and second sets of power control parameters to their respective groups of DSL lines.

2. The computer-implemented method according to claim 1, further comprising using a processing logic that applies the sets of power control parameters to their respective groups of DSL lines.

3. The computer-implemented method according to claim 1, wherein the first group of DSL lines comprises DSL lines having unequal lengths.

4. The computer-implemented method according to claim 1, wherein the first and second set of power control parameters comprise upstream power control parameters.

5. The computer-implemented method according to claim 1, further comprising using the first and second set of loop lengths as inputs to a model that performs the step of identifying.

6. The computer-implemented method according to claim 5, wherein the model estimates the first set of power control parameters.

7. The computer-implemented method according to claim 1, further comprising varying a second upstream rate for the second group of DSL lines while keeping the first upstream rate constant.

8. The computer-implemented method according to claim 7, wherein the second upstream rate is a maximum upstream rate.

9. The computer-implemented method according to claim 1, wherein the first set of loop lengths is assigned by taking into account attainable loop lengths of the first group of DSL lines.

10. The computer-implemented method according to claim 1, wherein the first set of loop lengths is a maximum loop length.

11. The computer-implemented method according to claim 1, wherein the set of criteria comprises a second upstream rate.

12. The computer-implemented method according to claim 1, further comprising prioritizing the first group of DSL lines over the group of DSL lines.

13. The computer-implemented method according to claim 1, further comprising using the model to determine attainable upstream data rates for the first and second groups of DSL lines.

14. The computer-implemented method according to claim 1, further comprising using the model to estimate a maximum upstream data rate for each of the first and second groups of DSL lines and estimating corresponding power parameters to attain the maximum upstream data rates for the first and second groups of DSL lines respectively.

15. The computer-implemented method according to claim 1, wherein the model receives as input an expected quantity of lines for at least one of the first group of DSL lines.

16. The computer-implemented method according to claim 1, further comprising prioritizing the first group of DSL lines to operate at an upstream data rate which is greater than the second group of DSL lines.

17. The computer-implemented method according to claim 16, further comprising restricting an upstream data rate for the second group of DSL lines as necessary to enable the first group of lines to operate at the upstream data rate for the first group of lines while the second group of DSL lines operates at the restricted upstream data rate.

18. The computer-implemented method according to claim 1, wherein the first group of DSL lines comprises vectored lines and the second group of DSL lines comprises non-vectored lines.

19. A system comprising:
   an interface to a communications system, the communications system having a plurality of DSL lines; and
   a processing logic that performs steps comprising:
      assigning a first set of loop lengths to a first group of DSL lines and a second set of loop lengths to a second group of DSL lines;
      for a first group of DSL lines, identifying a first set of power control parameters that enable a first upstream rate, the first set of power control parameters being subject to at least one of a given set of criteria for the second group of DSL lines or a second set of power control parameters for the second group of DSL lines; and
   a configuration module that instructs the respective groups of DSL lines to apply the sets of power control parameters.

20. A non-transitory computer-readable medium or media comprising one or more sequences of instructions which, when executed by at least one processor, cause steps to be performed comprising:
   assigning a first set of loop lengths to a first group of DSL lines and a second set of loop lengths to a second group of DSL lines;
   for a first group of DSL lines, identifying a first set of power control parameters that enable a first upstream rate, the first set of power control parameters being subject to at least one of a given set of criteria for the second group of DSL lines or a second set of power control parameters for the second group of DSL lines; and
   applying the sets of power control parameters to their respective groups of DSL lines.

* * * * *